(12) United States Patent
Lau et al.

(10) Patent No.: US 8,285,484 B1
(45) Date of Patent: *Oct. 9, 2012

(54) METHOD AND APPARATUS FOR INTELLIGENT ACQUISITION OF POSITION INFORMATION

(75) Inventors: Chung Lau, Sunnyvale, CA (US); C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/124,475

(22) Filed: May 9, 2005

Related U.S. Application Data

(63) Continuation of application No. 10/397,473, filed on Mar. 26, 2003, now Pat. No. 6,975,941.

(60) Provisional application No. 60/444,198, filed on Jan. 30, 2003, provisional application No. 60/418,491, filed on Oct. 15, 2002, provisional application No. 60/404,645, filed on Aug. 19, 2002, provisional application No. 60/375,998, filed on Apr. 24, 2002.

(51) Int. Cl.
*G01S 5/00* (2006.01)

(52) U.S. Cl. .................. 701/468; 340/988; 342/357.22; 342/357.74

(58) Field of Classification Search .................. 701/213, 701/468; 455/517, 404.2, 456.1, 574; 340/539.13, 340/988, 438, 928, 539, 540; 342/126, 357, 342/357.22, 357.74, 357.06; *G01S 5/00*
See application file for complete search history.

(56) References Cited

U.S. PATENT DOCUMENTS

| | | | |
|---|---|---|---|
| 5,347,274 A | 9/1994 | Hassett | |
| 5,389,934 A | 2/1995 | Kass | |
| 5,400,020 A | 3/1995 | Jones et al. | |
| 5,461,365 A | 10/1995 | Schlager et al. | |
| 5,491,486 A * | 2/1996 | Welles et al. | 342/357.74 |
| 5,512,902 A | 4/1996 | Guthrie et al. | |
| 5,515,858 A | 5/1996 | Myllymaki | |
| 5,528,247 A | 6/1996 | Nonami | |
| 5,528,518 A | 6/1996 | Bradshaw et al. | |
| 5,532,690 A | 7/1996 | Hertel | |
| 5,539,748 A | 7/1996 | Raith | |
| 5,541,845 A | 7/1996 | Klein | |
| 5,550,551 A | 8/1996 | Alesio | |
| 5,568,119 A | 10/1996 | Schipper et al. | |
| 5,570,412 A | 10/1996 | LeBlanc | |
| 5,576,716 A | 11/1996 | Sadler | |
| 5,592,173 A | 1/1997 | Lau et al. | |
| 5,598,460 A * | 1/1997 | Tendler | 455/404.2 |

(Continued)

FOREIGN PATENT DOCUMENTS

EP 0 874 529 A2 10/1998

(Continued)

OTHER PUBLICATIONS

Wong, "Fishers, golfers join the rush to GPS," San Jose Mercury News, news article, Mar. 25, 2002.

(Continued)

*Primary Examiner* — Tuan C. To

(57) ABSTRACT

Improved methods and systems for position acquisition and/or monitoring are disclosed. The position acquisition and/or monitoring can be performed with improved intelligence so that data acquisition, transmission and/or processing is reduced. As a result, the position acquisition and/or monitoring is able to be performed in a power efficient manner.

33 Claims, 7 Drawing Sheets

U.S. PATENT DOCUMENTS

| | | | |
|---|---|---|---|
| 5,604,708 A * | 2/1997 | Helms et al. | 365/229 |
| 5,623,260 A | 4/1997 | Jones | |
| 5,623,418 A | 4/1997 | Rostoker | |
| 5,629,678 A | 5/1997 | Gargano et al. | |
| 5,633,874 A | 5/1997 | Diachina et al. | |
| 5,650,770 A | 7/1997 | Schlager et al. | |
| 5,652,570 A | 7/1997 | Lepkofker | |
| 5,673,692 A | 10/1997 | Schulze et al. | |
| 5,686,888 A | 11/1997 | Welles, II et al. | |
| 5,710,551 A | 1/1998 | Ridgeway | |
| 5,712,619 A | 1/1998 | Simkin | |
| 5,731,757 A | 3/1998 | Layson et al. | |
| 5,731,788 A | 3/1998 | Reeds | |
| 5,742,233 A | 4/1998 | Hoffman et al. | |
| 5,751,245 A | 5/1998 | Janky et al. | |
| 5,771,001 A | 6/1998 | Cobb | |
| 5,771,455 A | 6/1998 | Kennedy, III et al. | |
| 5,774,876 A | 6/1998 | Woolley et al. | |
| 5,797,091 A | 8/1998 | Clise et al. | |
| 5,808,565 A | 9/1998 | Matta et al. | |
| RE35,920 E | 10/1998 | Sorden et al. | |
| 5,825,283 A | 10/1998 | Camhi | |
| 5,826,195 A | 10/1998 | Westerlage et al. | |
| 5,835,907 A | 11/1998 | Newman | |
| 5,841,352 A | 11/1998 | Prakash | |
| 5,844,862 A | 12/1998 | Cocatre-Zilgien | |
| 5,850,196 A | 12/1998 | Mowers | |
| 5,861,841 A | 1/1999 | Gildea et al. | |
| 5,883,594 A * | 3/1999 | Lau | 342/357.1 |
| 5,889,770 A | 3/1999 | Jokiaho et al. | |
| 5,892,454 A | 4/1999 | Schipper et al. | |
| 5,905,461 A | 5/1999 | Neher | |
| 5,913,078 A | 6/1999 | Kimura et al. | |
| 5,917,433 A | 6/1999 | Keillor et al. | |
| 5,918,180 A | 6/1999 | Dimino | |
| 5,938,721 A | 8/1999 | Dussell et al. | |
| 5,948,040 A | 9/1999 | DeLorme et al. | |
| 5,948,043 A | 9/1999 | Mathis | |
| 5,959,575 A | 9/1999 | Abbott | |
| 5,959,577 A | 9/1999 | Fan et al. | |
| 5,963,130 A | 10/1999 | Schlager et al. | |
| 5,982,285 A | 11/1999 | Bueche et al. | |
| 5,982,807 A | 11/1999 | Snell | |
| 5,983,108 A | 11/1999 | Kennedy, III et al. | |
| 5,991,690 A | 11/1999 | Murphy | |
| 5,995,849 A | 11/1999 | Williams et al. | |
| 6,002,363 A | 12/1999 | Krasner | |
| 6,002,982 A | 12/1999 | Fry | |
| 6,009,319 A | 12/1999 | Khullar et al. | |
| 6,013,007 A | 1/2000 | Root et al. | |
| 6,014,080 A | 1/2000 | Layson, Jr. | |
| 6,014,090 A | 1/2000 | Rosen et al. | |
| 6,023,241 A | 2/2000 | Clapper | |
| 6,031,496 A | 2/2000 | Kuittinen | |
| 6,032,051 A | 2/2000 | Hall et al. | |
| 6,034,622 A | 3/2000 | Levine | |
| 6,054,928 A | 4/2000 | Lemelson | |
| 6,064,336 A | 5/2000 | Krasner | |
| 6,067,018 A | 5/2000 | Skelton et al. | |
| 6,067,044 A * | 5/2000 | Whelan et al. | 342/357.74 |
| 6,072,396 A | 6/2000 | Gaukel | |
| 6,078,290 A | 6/2000 | McBurney et al. | |
| 6,083,248 A | 7/2000 | Thompson | |
| 6,083,353 A | 7/2000 | Alexander | |
| 6,094,168 A | 7/2000 | Duffett-Smith et al. | |
| 6,100,806 A | 8/2000 | Gaukel | |
| 6,101,710 A | 8/2000 | Selinger | |
| 6,111,540 A | 8/2000 | Krasner | |
| 6,115,595 A | 9/2000 | Rodal et al. | |
| 6,121,921 A * | 9/2000 | Ishigaki | 342/357.74 |
| 6,131,067 A | 10/2000 | Girerd et al. | |
| 6,140,863 A * | 10/2000 | Fujisawa | 327/540 |
| 6,141,570 A | 10/2000 | O'Neill, Jr. et al. | |
| 6,144,303 A | 11/2000 | Federman | |
| 6,148,280 A | 11/2000 | Kramer | |
| 6,154,422 A * | 11/2000 | Shinkawa et al. | 368/204 |
| 6,163,696 A | 12/2000 | Bi et al. | |
| 6,171,264 B1 | 1/2001 | Bader | |
| 6,172,640 B1 | 1/2001 | Durst et al. | |
| 6,175,616 B1 | 1/2001 | Light et al. | |
| 6,198,390 B1 | 3/2001 | Schlager et al. | |
| 6,198,431 B1 | 3/2001 | Gibson | |
| 6,198,930 B1 | 3/2001 | Schipper | |
| 6,199,045 B1 | 3/2001 | Giniger et al. | |
| 6,212,133 B1 * | 4/2001 | McCoy et al. | 368/9 |
| 6,226,622 B1 | 5/2001 | Dabbiere | |
| 6,231,519 B1 | 5/2001 | Blants et al. | |
| 6,232,916 B1 | 5/2001 | Grillo et al. | |
| 6,236,358 B1 | 5/2001 | Durst et al. | |
| 6,238,337 B1 | 5/2001 | Kambhatla et al. | |
| 6,243,039 B1 | 6/2001 | Elliot | |
| 6,243,660 B1 | 6/2001 | Hsu et al. | |
| 6,246,376 B1 | 6/2001 | Bork et al. | |
| 6,252,543 B1 | 6/2001 | Camp | |
| 6,263,280 B1 | 7/2001 | Stingone, Jr. | |
| 6,278,936 B1 | 8/2001 | Jones | |
| 6,281,797 B1 | 8/2001 | Forster | |
| 6,282,362 B1 | 8/2001 | Murphy et al. | |
| 6,282,495 B1 * | 8/2001 | Kirkhart et al. | 701/490 |
| 6,292,687 B1 | 9/2001 | Lowell et al. | |
| 6,298,306 B1 | 10/2001 | Suarez et al. | |
| 6,300,875 B1 | 10/2001 | Schafer | |
| 6,302,844 B1 | 10/2001 | Walker et al. | |
| 6,304,467 B1 * | 10/2001 | Nebrigic | 363/49 |
| 6,314,308 B1 * | 11/2001 | Sheynblat et al. | 455/574 |
| 6,317,049 B1 | 11/2001 | Toubia et al. | |
| 6,323,807 B1 | 11/2001 | Golding et al. | |
| 6,324,213 B1 | 11/2001 | Harrison | |
| 6,327,533 B1 | 12/2001 | Chou | |
| 6,331,817 B1 | 12/2001 | Goldberg | |
| 6,339,397 B1 | 1/2002 | Baker | |
| 6,340,928 B1 | 1/2002 | McCurdy | |
| 6,342,847 B1 | 1/2002 | Archuleta et al. | |
| 6,349,257 B1 | 2/2002 | Liu et al. | |
| 6,353,390 B1 | 3/2002 | Beri et al. | |
| 6,353,798 B1 | 3/2002 | Green et al. | |
| 6,356,841 B1 | 3/2002 | Hamrick et al. | |
| 6,362,778 B2 | 3/2002 | Neher | |
| 6,363,254 B1 | 3/2002 | Jones et al. | |
| 6,363,323 B1 | 3/2002 | Jones | |
| 6,373,430 B1 | 4/2002 | Beason et al. | |
| 6,377,810 B1 | 4/2002 | Geiger et al. | |
| 6,388,612 B1 | 5/2002 | Neher | |
| 6,393,346 B1 | 5/2002 | Keith et al. | |
| 6,404,352 B1 | 6/2002 | Ichikawa et al. | |
| 6,407,698 B1 | 6/2002 | Ayed | |
| 6,411,892 B1 | 6/2002 | Van Diggelen | |
| 6,411,899 B2 | 6/2002 | Dussell et al. | |
| 6,421,538 B1 | 7/2002 | Byrne | |
| 6,426,719 B1 * | 7/2002 | Nagareda et al. | 342/357.06 |
| 6,427,120 B1 | 7/2002 | Garin et al. | |
| 6,430,602 B1 | 8/2002 | Kay et al. | |
| 6,433,732 B1 | 8/2002 | Dutta et al. | |
| 6,434,396 B1 | 8/2002 | Rune | |
| 6,441,778 B1 | 8/2002 | Durst et al. | |
| 6,442,380 B1 | 8/2002 | Mohindra | |
| 6,442,391 B1 | 8/2002 | Johansson et al. | |
| 6,443,890 B1 | 9/2002 | Schulze et al. | |
| 6,445,937 B1 | 9/2002 | daSilva | |
| 6,453,237 B1 | 9/2002 | Fuchs et al. | |
| 6,463,272 B1 | 10/2002 | Wallace et al. | |
| 6,466,821 B1 | 10/2002 | Pianca et al. | |
| 6,469,639 B2 | 10/2002 | Tanenhaus et al. | |
| 6,471,087 B1 | 10/2002 | Shusterman | |
| 6,478,736 B1 | 11/2002 | Mault | 600/300 |
| 6,496,775 B2 | 12/2002 | McDonald, Jr. et al. | |
| 6,505,048 B1 | 1/2003 | Moles et al. | |
| 6,505,049 B1 * | 1/2003 | Dorenbosch | 455/456.2 |
| 6,513,532 B2 | 2/2003 | Mault et al. | 128/921 |
| 6,522,871 B1 | 2/2003 | Patrick et al. | |
| 6,522,889 B1 | 2/2003 | Aarnio | |
| 6,529,164 B1 | 3/2003 | Carter | |
| 6,544,193 B2 | 4/2003 | Abreu | 600/558 |
| 6,552,652 B2 * | 4/2003 | Beken | 340/407.1 |
| 6,553,336 B1 | 4/2003 | Johnson et al. | |
| 6,559,620 B2 | 5/2003 | Zhou et al. | |
| 6,569,094 B2 | 5/2003 | Suzuki et al. | |

| | | |
|---|---|---|
| 6,579,231 B1 | 6/2003 | Phipps ............................ 600/300 |
| 6,579,844 B1 | 6/2003 | Morrison et al. |
| 6,625,437 B1 | 9/2003 | Jampolsky et al. |
| 6,630,885 B2* | 10/2003 | Hardman et al. ............. 340/505 |
| 6,640,085 B1 | 10/2003 | Chatzipetros et al. |
| 6,650,907 B1 | 11/2003 | Kamperschroer et al. |
| 6,661,372 B1 | 12/2003 | Girerd et al. |
| 6,679,071 B1 | 1/2004 | Storey et al. |
| 6,696,982 B2* | 2/2004 | Yoshioka et al. ............. 340/988 |
| 6,714,791 B2 | 3/2004 | Friedman |
| 6,721,542 B1 | 4/2004 | Anttila et al. |
| 6,741,927 B2 | 5/2004 | Jones |
| 6,747,675 B1 | 6/2004 | Abbott et al. |
| 6,748,318 B1 | 6/2004 | Jones |
| 6,788,766 B2* | 9/2004 | Logan ........................... 379/67.1 |
| 6,801,853 B2 | 10/2004 | Workman |
| 6,804,606 B2 | 10/2004 | Jones ............................. 701/213 |
| 6,847,892 B2 | 1/2005 | Zhou et al. |
| 6,856,804 B1 | 2/2005 | Ciotta |
| 6,865,385 B1 | 3/2005 | Kohda et al. |
| 6,937,900 B1 | 8/2005 | Pianca et al. |
| 6,952,645 B1 | 10/2005 | Jones |
| 6,975,941 B1* | 12/2005 | Lau et al. ....................... 701/213 |
| 6,980,826 B2 | 12/2005 | Yamaguchi |
| 7,010,144 B1 | 3/2006 | Davis et al. |
| 7,071,842 B1 | 7/2006 | Brady, Jr. |
| 7,085,253 B2 | 8/2006 | Yang |
| 7,110,773 B1 | 9/2006 | Wallace et al. |
| 7,136,832 B2 | 11/2006 | Li et al. |
| 7,187,278 B2 | 3/2007 | Biffar |
| 7,212,829 B1 | 5/2007 | Lau et al. |
| 7,218,938 B1 | 5/2007 | Lau et al. |
| 7,253,731 B2 | 8/2007 | Joao |
| 7,321,774 B1 | 1/2008 | Lau et al. |
| 7,325,061 B2 | 1/2008 | Haruki |
| 7,366,522 B2 | 4/2008 | Thomas |
| 7,403,972 B1 | 7/2008 | Lau et al. |
| 7,539,557 B2 | 5/2009 | Yamauchi |
| 7,809,377 B1 | 10/2010 | Lau et al. |
| 7,905,832 B1 | 3/2011 | Lau et al. |
| 7,953,809 B2 | 5/2011 | Lau et al. |
| 2001/0006891 A1 | 7/2001 | Cho |
| 2001/0020204 A1 | 9/2001 | Runyon et al. |
| 2001/0027378 A1 | 10/2001 | Tennison et al. |
| 2001/0028304 A1 | 10/2001 | I'Anson et al. |
| 2001/0044299 A1 | 11/2001 | Sandegren |
| 2001/0044332 A1 | 11/2001 | Yamada et al. |
| 2001/0052849 A1 | 12/2001 | Jones, Jr. |
| 2002/0000930 A1 | 1/2002 | Crowson et al. |
| 2002/0016173 A1 | 2/2002 | Hunzinger |
| 2002/0027507 A1 | 3/2002 | Yarin et al. |
| 2002/0036593 A1 | 3/2002 | Ying |
| 2002/0038182 A1 | 3/2002 | Wong et al. |
| 2002/0049742 A1* | 4/2002 | Chan et al. ......................... 707/1 |
| 2002/0050945 A1 | 5/2002 | Tsukishima et al. |
| 2002/0057192 A1 | 5/2002 | Eagleson et al. |
| 2002/0063622 A1 | 5/2002 | Armstrong et al. |
| 2002/0071677 A1 | 6/2002 | Sumanaweera |
| 2002/0077080 A1 | 6/2002 | Greene |
| 2002/0087260 A1 | 7/2002 | Hancock et al. |
| 2002/0087619 A1 | 7/2002 | Tripathi |
| 2002/0094067 A1 | 7/2002 | August |
| 2002/0111171 A1 | 8/2002 | Boesch et al. |
| 2002/0111819 A1 | 8/2002 | Li et al. |
| 2002/0115453 A1 | 8/2002 | Poulin et al. |
| 2002/0119770 A1 | 8/2002 | Twitchell, Jr. |
| 2002/0119789 A1 | 8/2002 | Friedman |
| 2002/0120475 A1 | 8/2002 | Morimoto |
| 2002/0120503 A1 | 8/2002 | Iwayama et al. |
| 2002/0140081 A1 | 10/2002 | Chou et al. |
| 2002/0193121 A1 | 12/2002 | Nowak et al. |
| 2003/0003943 A1 | 1/2003 | Bajikar |
| 2003/0009410 A1 | 1/2003 | Ramankutty et al. |
| 2003/0013445 A1 | 1/2003 | Fujiwara et al. |
| 2003/0069759 A1 | 4/2003 | Smith |
| 2003/0083011 A1 | 5/2003 | Haller et al. |
| 2003/0151507 A1 | 8/2003 | Andre et al. |
| 2003/0163287 A1 | 8/2003 | Vock |
| 2003/0204132 A1 | 10/2003 | Suzuki et al. |
| 2004/0034470 A1 | 2/2004 | Workman |
| 2004/0046637 A1 | 3/2004 | Wesby Van Swaay |
| 2004/0114731 A1 | 6/2004 | Gillett et al. |
| 2004/0117108 A1* | 6/2004 | Nemeth ......................... 701/200 |
| 2004/0233065 A1 | 11/2004 | Freeman |
| 2006/0173444 A1 | 8/2006 | Choy et al. |
| 2007/0156286 A1 | 7/2007 | Yamauchi |
| 2008/0021645 A1 | 1/2008 | Lau et al. |
| 2008/0261636 A1 | 10/2008 | Lau et al. |
| 2009/0042540 A1 | 2/2009 | Bodnar et al. |
| 2011/0022533 A1 | 1/2011 | Lau et al. |
| 2011/0223884 A1 | 9/2011 | Lau et al. |

FOREIGN PATENT DOCUMENTS

| | | |
|---|---|---|
| EP | 1 037 447 A2 | 9/2000 |
| EP | 1 037 447 A3 | 10/2001 |
| JP | 11-64482 | 3/1999 |
| JP | 11-258325 | 8/1999 |
| JP | 11-289574 | 10/1999 |
| JP | 11-306491 | 11/1999 |
| WO | WO 97/14054 | 4/1997 |
| WO | WO 97/41654 | 11/1997 |
| WO | WO 98/01769 A1 | 1/1998 |
| WO | WO 98/16045 | 4/1998 |
| WO | WO 98/40837 | 9/1998 |
| WO | WO 00/51391 | 8/2000 |
| WO | WO 01/50151 A1 | 7/2001 |
| WO | WO 01/63318 A1 | 8/2001 |
| WO | WO 01/75700 A2 | 10/2001 |
| WO | WO 02/42979 A1 | 5/2002 |
| WO | WO 02/084618 A1 | 10/2002 |
| WO | WO 03/012720 A1 | 2/2003 |

OTHER PUBLICATIONS

TruePosition Virtual Brochure (webpage), TruePosition, Inc.
Swift B2 GPS Receiver, Specification sheet by Axiom Navigation Inc. (www.axiomnav.com).
Swift A2 GPS Receiver, Specification sheet by Axiom Navigation Inc. (www.axiomnav.com).
Stilp, Louis A., "Examining the Coming Revolution in Location Services," pp. 1-11.
SnapTrack in Action (webpage), SnapTrack Inc., downloaded Jan. 19, 2000.
SnapTrack—Technology at Work (webpage), SnapTrack Inc., downloaded Jan. 19, 2000.
SnapTrack—Privacy Protection (webpage), SnapTrack Inc., downloaded Jan. 19, 2000.
Smart Antenna, Specification sheet by Axiom Navigation Inc. (www.axiomnav.com).
SandPiper GPS Receiver, Specification sheet by Axiom Navigation Inc. (www.axiomnav.com).
Ryan, "Catching up with Dick Tracy," San Francisco Chronicle, news article, Mar. 18, 2002.
Real Time Locating System, Executive Summary, Technology Systems International, Inc.
Rabinowitz and Spilker, Jr., "Positioning Using the ATSC Digital Television Signal," Rosum Corporation Whitepaper, Rosum Corporation (downloaded May 21, 2003).
Rabinowitz and Spilker, Jr., "A New Positioning System Using Television Synchronization Signals," Rosum Corporation, pp. 1-11 (downloaded May 21, 2003).
Precision Accelerometers, PCB Piezoelectronics Products—SVS Division, webpages, pp. 1-2 (downloaded Apr. 11, 2002: www.pcb.com/products/svs/index.html).
Packtrack™, PackTrack.com, webpages, pp. 1-2 (downloaded Jun. 9, 2002: www.packtrack.com).
My.Roadway!, Roadway Express, Inc., webpages, pp. 1-2, (downloaded Jun. 9, 2002: www.quiktrak.roadway.com/cgi-bin/quiktrak).
Motorola Consumer Catalog: Pagers (webpage), Motorola, Inc., downloaded Jan. 19, 2000.
Marek, "The Unstoppable SnapTrack," Wireless Week, Dec. 18, 2000.
LoadTrak, pp. 1-2 (downloaded Jun. 4, 2002: www.load-trak.com).
Kleinknecht, William, "Juvenile authorities want satellite tracking for felons," The Star-Ledger of New Jersey, Nov. 18, 1997.

K. Miyake, "Sharp to unveil 3G PDA-type cell phone," ITworld.com, Inc., Jan. 11, 2002.
K. Hill, "Prada Uses Smart Tags to Personalize Shopping," CRMDaily.com, Apr. 24, 2002., pp. 1-4.
J.Wrolstad, "Chrysler Claims First With Bluetooth Mobile Phone System," Wireless Newsfactor, Oct. 26, 2001.
IMVironment, Yahoo! Messenger Yahoo! Inc., 2002, pp. 1-12 (downloaded (including) Oct. 27, 2002: http://help.yahoo.com/help/us/mesg/imv/imv-01.html(through/index5.html).
GPS2000, Omega Research and Development, Inc., webpages, pp. 1-9 (pp. 7-9 pertain to an online tour) (downloaded Jul. 14, 2003: www.gps2000online.com/).
FedEx Insight, FedEx, webpages, pp. 1-11 (downloaded Oct. 29, 2002: www.fedex.com).
F. Rivera, "Special Report: Keeping Tabs on Your Teen," 7 News, Boston, Apr. 30, 2002, pp. 1-3.
Delphi and MobileAria Demonstrate True Hands Free In-Vehicle Mobile Productivity Services at CES, Press Release, Delphi Automotive Systems, Jan. 8, 2002 (downloaded Apr. 5, 2002: www.delphiauto.com/news/pressRelease/pr6828-01082002).
Crossbow Product Guide—Accelerometers, Crossbow Technology, Inc., webpages, pp. 1-3 (downloaded Apr. 11, 2002: www.xbow.com/Products/Accelerometers.htm).
Commercial Uses for LoJack (webpage), LoJack Corporation, downloaded Jan. 22, 2000.
Chertkoff, Rachel, "Vehicle Locator Systems," Pager Technology, pp. 1-2, 1998.
Bickers, "Eyes in the sky," SafeTzone Technology Corporation, webpages, 2001, pp. 1-3 (downloaded: www.safetzone.com/newsKiosk.asp).
Accelerometers—General Purpose, LP Series, Crossbow Technology, Inc., data sheet, pp. 1-3 (downloaded Apr. 11, 2002: www.xbow.com/Products/Accelerometers.htm).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).
"Yahoo! Messenger for Text Messaging," Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger—Sending Messages to a Mobile Phone," Yahoo! Messenger, Yahoo! Inc., 2002, pp. 1-7 (downloaded Oct. 27, 2002: http://messenger.yahoo.com/messenger/wireless/pc2sms/tour1.html(through /tour7.html)).
"X-GPS™—Hybrid GPS Location Server Solution," Axiom Navigation Inc., 2000-2001 (downloaded Oct. 19, 2002: www.axiomnav.com/Prod_Global/x-gps.asp).
"Wherify Wireless Location Services," Wherify Wireless, Inc., webpages, pp. 1-5 (downloaded: Mar. 25, 2003: www.wherifywireless.com/prod_watches.htm).
"Wherify Wireless GPS Locator for Kids User Guide," Wherify Wireless, Inc., 2003, pp. 1-106.
"Wherify Wireless Breakthrough in Location-Based Services," Mobilemag.com, Feb. 28, 2001, p. 1.
"Wherify Wireless and SiRF Team to Deliver Child Locator System," Wherify Wireless, Inc., Press Release, Mar. 19, 2001, pp. 1-2.
"What is a Friend List?" Yahoo! Messenger Help, Yahoo! Inc., 2002, pp. 1.
"What is "3G" technology?," CNN.com/SCI-TECH, Oct. 22, 2001, pp. 1-3.
"What are Instant Messages?" Yahoo! Messenger Help, Yahoo! Inc., 2002, pp. 1.
"Welcome to Traker Systems," Tracker Systems, webpages, pp. 1-2 (downloaded Jun. 9, 2002: www.trakersystems.com).
"Welcome to Iship, Inc.," iShip, Inc., webpages, pp. 1-2, (downloaded Jun. 9, 2002: www.iship.com/).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
"UPS Package Tracking," United Parcel Service of America, Inc. (UPS), webpages, pp. 1-2 (downloaded Apr. 13, 2002: www.ups.com/tracking/tracking.html).

"Turning Position Into Knowledge," SkyBitz, webpage, p. 1, (downloaded Nov. 15, 2002: www.skybitz.com).
"Trimble and Rosum Team to Develop Universal Positioning Technology," Trimble Navigation, Inc., News Release, Feb. 27, 2003.
"Tracking Helpful Tips," United Parcel Service of America, Inc. (UPS), webpages, pp. 1-2 (downloaded Jun. 1, 2002: www.ups.com/tracking/nm_help.html).
"Track Your FedEx Shipments via Email," FedEx, webpages, pp. 1-2 (downloaded Oct. 29, 2002: www.fedex.com).
"Track Shipments—Detailed Results," FedEx, webpages, pp. 1-2 (downloaded Oct. 29, 2002: www.fedex.com).
"Theme Park Visitors & Cashless Purchasing," Case Study, RJI Incorporated, webpages, pp. 1-2 (downloaded Mar. 16, 2002: www.rji.cc/casestudies/themepark.html).
"The Always on Network," Position Paper, Nortel Networks, 2002.
"Technical Applications of Our Current Technology," Aetherwire, webpages, pp. 1-4 (downloaded Mar. 16, 2002: www.aetherwire.com/CDROM/General/appl1.html).
"Status Icons/Messages," Yahoo! Messenger Help, Yahoo! Inc., 2002, pp. 1-2.
"Start-up crams single chip with phone, GPS and Bluetooth," CNET Network, Inc. (ZDNET), Mar. 22, 2002 (downloaded: http://news.zdnet.co.uk/story/0,t284-s2107163,00.html).
"SnapTrack Awarded Additional Key Patents for Enhanced GPS System," Press Release, SnapTrack Inc., Jan. 4, 2000.
"SnapTrack and SignalSoft Corp. Team Up to Trial Location-based Information Service for GSM Test Group," Press Release, SnapTrack Inc., Dec. 6, 1999.
"Ski Rental with Auto ID and Tracking," Case Study, RJI Incorporated, webpages, pp. 1-2 (downloaded Mar. 16, 2002: www.rji.cc/casestudies/skirentalcompany.html).
"Send images to i-mode phones," Mobile Media Japan, 2001, pp. 1-3.
"Savi Reusable Transport Container," Savi Technology, Inc., Apr. 30, 2002, pp. 1-2.
"Real-Time Warehouse Tracking," Case Study, RJI Incorporated, webpages, pp. 1-2 (downloaded Mar. 16, 2002: www.rji.cc/casestudies/rtwarehousetracking.html).
"Real Time Location System (RTLS)," Case Study, RJI Incorporated, webpage, p. 1 (downloaded Mar. 16, 2002: www.rji.cc/technology/rtls.html).
"Radio Frequency Identification (RFID)," Case Study, RJI Incorporated, webpage, p. 1 (downloaded Mar. 16, 2002: www.rji.cc/technology/rfid.html).
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Parkwatch and Wherenet Unveil the First Amusement Visitor Locating system," ParkWatch, Press Release, Jun. 27, 2000.
"Pakhound: Your Watchdog in the Shipping Industry," website pages, pp. 1-3 (downloaded Jun. 9, 2002: www.pakhound.com/fact.asp).
"News," SkyBitz, webpages, pp. 1-8, (downloaded Nov. 15, 2002: www.skybitz.com/about/news.html).
"NavMate® Navigation System," Visteon Corporation, webpage, pp. 1-2 (downloaded Jun. 21, 2002: www.visteon.corn/technology/automotive/navmate.html).
"My UPS.COM Benefits," United Parcel Service of America, Inc. (UPS), webpage, p. 1 (downloaded Apr. 13, 2002: www.ups.com/myupsinfo/info/benefits?pnav=stdsservice).
"MoniTrack," Case Study, RJI Incorporated, webpages, pp. 1-2 (downloaded Mar. 16, 2002: www.rji.cc/technology/telematic.html).
"Mobile Location Based Services: Cell Tracking Devices of People & Thongs . . . ," pp. 1-2, (downloaded Aug. 10, 2002: http://3glocate.com).
"MMS phones: Don't believe the hype," CNN.com/SCI-TECH, Aug. 8, 2002, pp. 1-3.
"Locate Networks: Our Service," Locate Networks, webpages, pp. 1-7 (downloaded Sep. 26, 2002: www.locatenetworks.com/).
"IO Data Develops GPS Adapter for I-Mode Mobile," AsiaBizTech, Sep. 17, 2002, pp. 1-2.
"Introduction to SMS," by C. Tull of AnywhereYouGo.com, pp. 1-4 (downloaded:www.devx.com/wireless/articles/SMS/SMSintro-asp).

"Guide to Tracking Info.," Nippon Express, website page, p. 1 (downloaded Jun. 9, 2002: www.nittsu.co.jp/edoc/howtoe.htm).
"GLS Communicator," SkyBitz, webpages, pp. 1-2, (downloaded Nov. 15, 2002: www.skybitz.com/gls/communicator.html).
"Global Locating Services," SkyBitz, webpage, p. 1, (downloaded Nov. 15, 2002: www.skybitz.com/services/gls.html).
"Global Cell Phone Location," Axiom Navigation Inc., 2000-2001 (downloaded Oct. 19, 2002: www.axiomnav.com/Prod_Global/prod_global.asp).
"FunMail Launches on the NTT DoCoMo i-mode network," FunMail, Press Release, May 1, 2001, pp. 1-2.
"Frozen Food Warehouse," Case Study, RJI Incorporated, webpages, pp. 1-3 (downloaded Mar. 16, 2002: www.rji.cc/casestudies/frozenfoodwarehouse.html).
"Fleet Management Systems-Asset Tracking Devices," Axiom Navigation Inc., 2000-2001 (downloaded Oct. 19, 2002: www.axiomnav.com/Prod_Systems/prod_system.asp).
"Enhanced Tracking," United Parcel Service of America, Inc. (UPS), webpages, pp. 1-2 (downloaded Jun. 1, 2002: www.ups.com/myupsinfo/info/etrack?pnav=stdservice).
"EarthTrack™ Vehicle Tracking Systems," Outfitter Satellite, Inc., 1998 (downloaded Jan. 22, 2000).
"Digital/Analog Compass Sensors" and "1655 Digital Compass Sensor," webpages, The Robson Company, Inc., pp. 1-2 (downloaded Apr. 11, 2002: www.dinsmoresensors.com/index.html).
"Devices for Text Messages in Deutsche Telekom's fixed network have already found their way into many households," Deutsche Telekom AG, Press Release, Mar. 13, 2002, pp. 1-2.
"Developing a GPSs for the Global Supply Chain," Aberdeen Group, Inc., Executive White Paper, Jun. 2002.
"Danger-Products" and "Hiphop Communicator Brochure," Danger, Inc., downloaded Oct. 26, 2003: www.danger.com/products.php).
"Carrier and end-user applications for wireless location systems," TruePosition, Inc., pp. 1-7.
"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).
"An Introduction to SnapTrack Server-Aided GPS Technology," SnapTrack Inc.
"Airline Food Carts," Case Study, RJI Incorporated, webpages, pp. 1-2 (downloaded Mar. 16, 2002: www.rji.cc/casestudies/airlinefoodcarts.html).
"Airline Cargo Containers," Case Study, RJI Incorporated, webpages, pp. 1-2 (downloaded Mar. 16, 2002: www.rji.cc/casestudies/airlinecargocontainers.html).
"3G Mobile Internet Revolution, . . . only with Location Based Services!" pp. 1, (downloaded Aug. 10, 2002: http://webhome.idirect.com/~dental/3glocator/home.htm).
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/svs/svs352c22.html).
U.S. Appl. No. 12/150,203, filed Apr. 26, 2008.
U.S. Appl. No. 12/150,126, filed Apr. 26, 2008.
Office Action for U.S. Appl. No. 10/397,473, dated Nov. 25, 2003.
Office Action for U.S. Appl. No. 10/397,473, dated Jun. 28, 2004.
Office Action for U.S. Appl. No. 10/397,473, dated Nov. 17, 2004.
Office Action for U.S. Appl. No. 12/381,776, dated Dec. 6, 2010.
Restriction Requirement for U.S. Appl. No. 12/381,776, dated Feb. 19, 2010.
Notice of Allowance for U.S. Appl. No. 10/397,473, dated Mar. 29, 2005.
Notice of Allowance for U.S. Appl. No. 10/397,473, dated Jun. 9, 2005.
Notice of Allowance for U.S. Appl. No. 10/397,473, dated Nov. 3, 2005.
Office Action for U.S. Appl. No. 10/381,776, dated Jul. 20, 2011.
Office Action for U.S. Appl. No. 10/397,473, dated Jun. 8, 2004.
Office Action for U.S. Appl. No. 12/381,776, dated Jan. 3, 2012.
Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.
Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.
"Car Thieves Take the 'Bait' in Tulsa; Two Suspects Caught Off Guard with on Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express-News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company," Southwest Newswire, Mar. 21, 1996.
"Automotive GPS Satellite/Safety System Race is on," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
Briefs, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.
Archived page entitled "Money-Back Guarantee Policy" from fedex.com, archived by the Internet Archive on Aug. 17, 2000.
Strom, Stephanie. "A Wild Sleigh Ride at Federal Express," The New York Times, Dec. 20, 1994.
Danger Product Overview, 5 pgs., Danger, Inc.
PCV*trak*™ M Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "SECURITY—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.

"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express-News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express-News, Apr. 18, 1996, pp. 2, part B.
"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World-Herald, Section Business, p. 4M, Oct. 20, 1996.
"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.
High-Tech System Tracks Offenders—Satellites Watching Criminals, Business Wire, Nov. 14, 1997.
Briefs, Global Positioning & Navigation News, vol. 9, No. 4, Feb. 24, 1999.
Dunkelberger, Lloyd, "Lawmakers question criminal-tracking system," Sarasota Herald-Tribune (Florida), pp. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecurityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers 'GPS' Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.
Atwater, Andi, "Proposal seeking 24-hour tracking of all sex offenders," The News-Press (Fort Meyers, FL), pp. 1A, Feb. 20, 2000.
Briefs, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
Briefs, Global Positioning & Navigation News, vol. 9, No. 2, Jan. 27, 1999.
Briefs, Global Positioning & Navigation News, vol. 9, No. 14, Jul. 14, 1999.
Dailey et al. "Automatic Transit Location System," Final Research Report, 55 pgs., Feb. 1996.
Maguire, Jr. et al. "SmartBadges: a wearable computer and communication system," codes/CASHE '98, 47 pgs., 1998.
Culler et al., *MICA: The Commercialization of Microsensor Motes*, Sensors, vol. 19, No. 4 (Apr. 1, 2002).
Darabi et al., *A 2.4-GHz CMOS Transceiver for Bluetooth*, IEEE Journal of Solid-State Circuits, vol. 36, No. 12 (Dec. 2001).
J. Fraden, Handbook of Modern Sensors, Springer-Verlag (1996).
Grimes, Craig A., et al., *Wireless Magnetoelastic Resonance Sensors: A Critical Review*, Sensors (Jul. 23, 2002).
Helfenstein et al. Circuits and Systems for Wireless Communications, Kluwer Academic Publishers (2000).
Hill et al., *System Architecture Directions for Networked Sensors*, ACM/ASPLOS-IX (Nov. 2000).
Madou, Marc J., Fundamentals of Microfabrication, CRC Press (2002).
Mainwaring et al., *Wireless Sensor Networks for Habitat Monitoring*, ACM (Sep. 28, 2002).
Razavi, Behzad, RF Microelectronics, Prentice Hall (1998).
Rofougaran et al., *A Single-Chip 900-MHz Spread-Spectrum Wireless Transceiver in 1-μm CMOS—Part II: Receiver Design*, IEEE Journal of Solid-State Circuits, vol. 33, No. 4 (Apr. 1998).
Senturia, Stephen D., Microsystem Design, Kluwer Academic Publishers (2001).

* cited by examiner

US 8,285,484 B1

METHOD AND APPARATUS FOR INTELLIGENT ACQUISITION OF POSITION INFORMATION

CROSS REFERENCE TO RELATED APPLICATIONS

This application is a continuation of U.S. patent application Ser. No. 10/397,473, filed Mar. 26, 2003, and entitled "METHOD AND APPARATUS FOR INTELLIGENT ACQUISITION OF POSITION INFORMATION," now U.S. Pat. No. 6,975,941, which is hereby incorporated herein by reference, and which claims the benefit of the following provisional patent applications:

(i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby Incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

This application is also related to: (i) U.S. patent application Ser. No. 10/397,472, filed Mar. 26, 2003, and entitled "METHODS AND APPARATUS TO ANALYZE AND PRESENT LOCATION INFORMATION," now U.S. Pat. No. 7,218,938; (ii) U.S. patent application Ser. No. 10/397,637, filed Mar. 26, 2003, and entitled "METHOD AND SYSTEM FOR PROVIDING SHIPMENT TRACKING AND NOTIFICATIONS," now U.S. Pat. No. 7,212,829; (iii) U.S. patent application Ser. No. 10/397,641, filed Mar. 26, 2003, and entitled "METHOD AND SYSTEM FOR PERSONALIZED MEDICAL MONITORING AND NOTIFICATIONS THEREFOR," now U.S. Pat. No. 7,905,832; (iv) U.S. patent application Ser. No. 10/397,640, filed Mar. 26, 2003, and entitled "INEXPENSIVE POSITION SENSING DEVICE," now U.S. Pat. No. 7,321,774; (v) U.S. patent application Ser. No. 10/397,474, filed Mar. 26, 2003, and entitled "METHOD AND SYSTEM FOR ENHANCED MESSAGINg," now U.S. Pat. No. 7,403,972; (vi) U.S. patent application Ser. No. 10/397,512, filed Mar. 26, 2003, and entitled "APPLICATIONS OF STATUS INFORMATION FOR INVENTORY MANAGEMENT.

BACKGROUND OF THE INVENTION

1. Field of the Invention

The present invention relates to position detection and, more particularly, to improved techniques for acquisition of position information.

2. Description of the Related Art

Position determining devices have become popular for motor vehicle or vessel navigation. Typically, these devices utilize the global availability of Global Positioning Systems (GPS). These device can be dedicated to particular vehicles or vessels. More recently, these position determining devices (often known as GPS receivers) have become portable.

Unfortunately, these devices, if standalone, are battery operated and not typically designed to be able to monitor position over a long duration of time. More particularly, because these devices require frequent radio-frequency communications, computational processing and information display, they consume large amounts of power and thus their battery life is limited. Also, these devices remain relatively expensive and have a relatively large form factor.

As a result, conventional position determining devices are not suitable for use in many applications due to their power consumption. Thus, there is a need for position determining devices that have reduced power consumption. It would be further advantageous if position determining devices were smaller and less expensive.

SUMMARY OF THE INVENTION

Broadly speaking, the invention relates to improved methods and systems for position acquisition and/or monitoring. The position acquisition and/or monitoring can be performed with improved intelligence so that data acquisition, transmission and/or processing is reduced, which provides improved power efficiency.

According to one embodiment of the invention, a portable position acquisition apparatus can include one or more components that have a low-power state which can be used to reduce power consumption of the position acquisition apparatus. According to another aspect of the invention, the position acquisition can be performed dependent on one or more of motion information, at least one battery level characteristic of a battery, and a change in position. According to still another aspect of the invention, the acquired position information can be transmitted to a remote device (e.g., central server) dependent on one or more of motion information, at least one battery level characteristic of a battery, and a change in position. According to still yet another aspect of the invention, a portable, battery-powered position acquisition apparatus is used to acquire position information and a solar panel provides electrical charge to its battery.

The invention can be implemented in numerous ways including, a method, system, device, apparatus, and a computer readable medium. Several embodiments of the invention are discussed below.

As a portable position acquisition apparatus, one embodiment of the invention includes at least: a position detection unit that detects position information pertaining to the position acquisition apparatus; a memory that stores the position information; a motion monitoring unit that monitors motion of the position acquisition apparatus; a battery for providing power to the position acquisition apparatus; and a controller operatively connected to the position detection unit, the memory, the battery and the motion monitoring unit. The controller determines whether the position detection unit should reacquire the position information based on at least (i) the motion identified by the motion monitoring unit and (ii) a battery level characteristic of the battery.

As a portable position acquisition apparatus, another embodiment of the invention includes at least: a battery for providing power to the position acquisition apparatus, the battery have a battery level characteristic; a position detection unit that detects position information pertaining to the position acquisition apparatus; a memory that stores the position information; and a controller operatively connected to the battery, the position detection unit and the memory. The controller dynamically determines how frequent the position information is reacquired by the position detection unit based on at least the battery level characteristic of the battery.

As a portable position acquisition apparatus, still another embodiment of the invention includes at least: a position detection unit that detects position information pertaining to the position acquisition apparatus; a memory that stores the position information; a motion monitoring unit that monitors motion of the position acquisition apparatus; a battery for providing power to the position acquisition apparatus; and a controller operatively connected to the position detection unit, the memory and the motion monitoring unit. The controller causes the position detection unit to reacquire the position information on a periodic basis based on the motion identified by the motion monitoring unit.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved methods and systems for position acquisition and/or monitoring. The position acquisition and/or monitoring can be performed with improved intelligence so that data acquisition, transmission and/or processing is reduced, which provides improved power efficiency.

According to one embodiment of the invention, a portable position acquisition apparatus can include one or more components that have a low-power state which can be used to reduce power consumption of the position acquisition apparatus. According to another aspect of the invention, the position acquisition can be performed dependent on one or more of motion information, at least one battery level characteristic of a battery, and a change in position. According to still another aspect of the invention, the acquired position information can be transmitted to a remote device (e.g., central server) dependent on one or more of motion information, at least one battery level characteristic of a battery, and a change in position. According to still yet another aspect of the invention, a portable, battery-powered position acquisition apparatus is used to acquire position information and a solar panel provides electrical charge to its battery.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
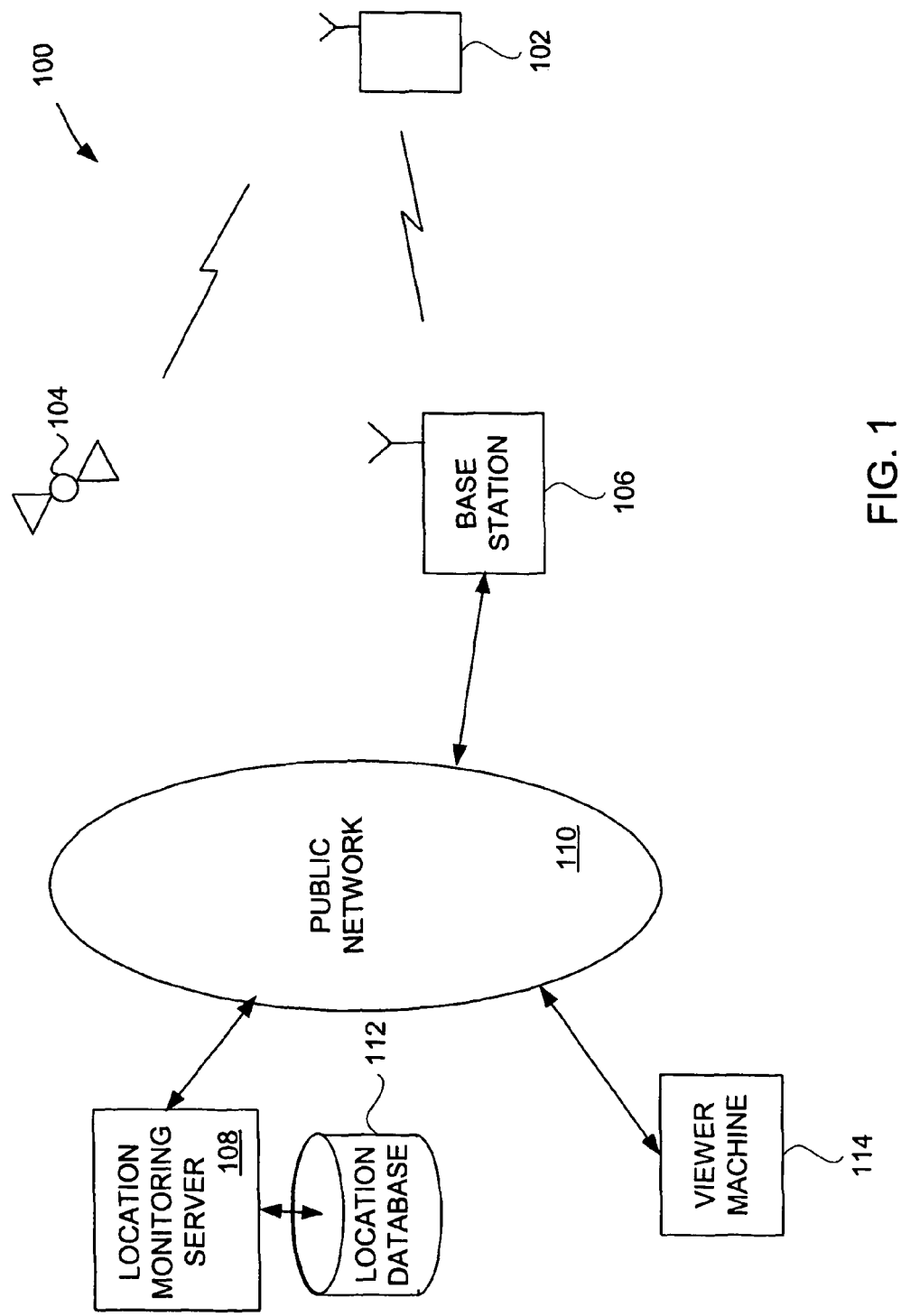
FIG. 1 is a block diagram of a location monitoring system according to one embodiment of the invention.

FIG. 1 is a block diagram of a location monitoring system 100 according to one embodiment of the invention. The location monitoring system 100 operates to monitor the location of mobile devices using a Global Positioning System (GPS). The location monitoring system 100 includes one or more mobile devices 102. The mobile devices 102 can receive position information from a GPS satellite 104. The mobile devices 102 also communicate through a wireless link to a base station 106. The base station 106 in turn can couple to a location monitoring server 108 through a public network 110. As an example, the public network 110 can include the Internet, a wide area network (WAN), or a local area network (LAN). The location monitoring server 108 typically couples to a location database 112 which serves to store location information for the mobile devices 102.

The location monitoring system 100 also permits a viewer machine 114 to interact with the location monitoring server 108 through the public network 110. In this regard, a user of the viewer machine 114 is able to interact with the location monitoring server 108 to retrieve the location (or position) information for one or more of the mobile devices 102 using the location data stored in the location database 112. Typically, such location information that is retrieved from the location database 112 is forwarded from the location monitoring server 108 through the public network 110 to the viewer machine 114 where it can be reviewed by the user of the viewer machine 114. As one example, the viewer machine 114 can be a computer, such as a personal computer. Note that the term viewer machine 114 is used in a general sense. In other words, the process of accessing location information at the viewer machine 114 is not limited to visual viewing by way of a screen display. For example, a user can review (receive) such information through audio means (e.g., voice).

Since the mobile devices 102 are mobile in nature, and thus battery powered, the tracking of the location of the mobile devices 102 can impose a power consumption difficulty for the mobile devices 102. Each time one of the mobile devices 102 captures and forwards its location to the location monitoring server 108, electronic charge from its battery is consumed for such location monitoring purposes. Hence, although the location monitoring system 100 desires to monitor the location of the mobile devices 102 on a frequent basis (e.g., at all times, limited times, periodically, on-demand), the mobile devices 102 themselves should not be unduly burdened with respect to power consumption for such purposes. According to one aspect of the invention, the mobile devices 102 operate to conserve power consumption while still permitting consistent location monitoring.

The mobile devices 102 are typically hand-held devices that operate under battery control. The mobile devices 102 incorporate location detection circuitry but can also include other circuitry to support other functions associated with the mobile devices 102. For example, the mobile devices 102 can further operate as cameras, cellular phones, portable digital assistants (PDAs), or portable computers.

Figure 2:
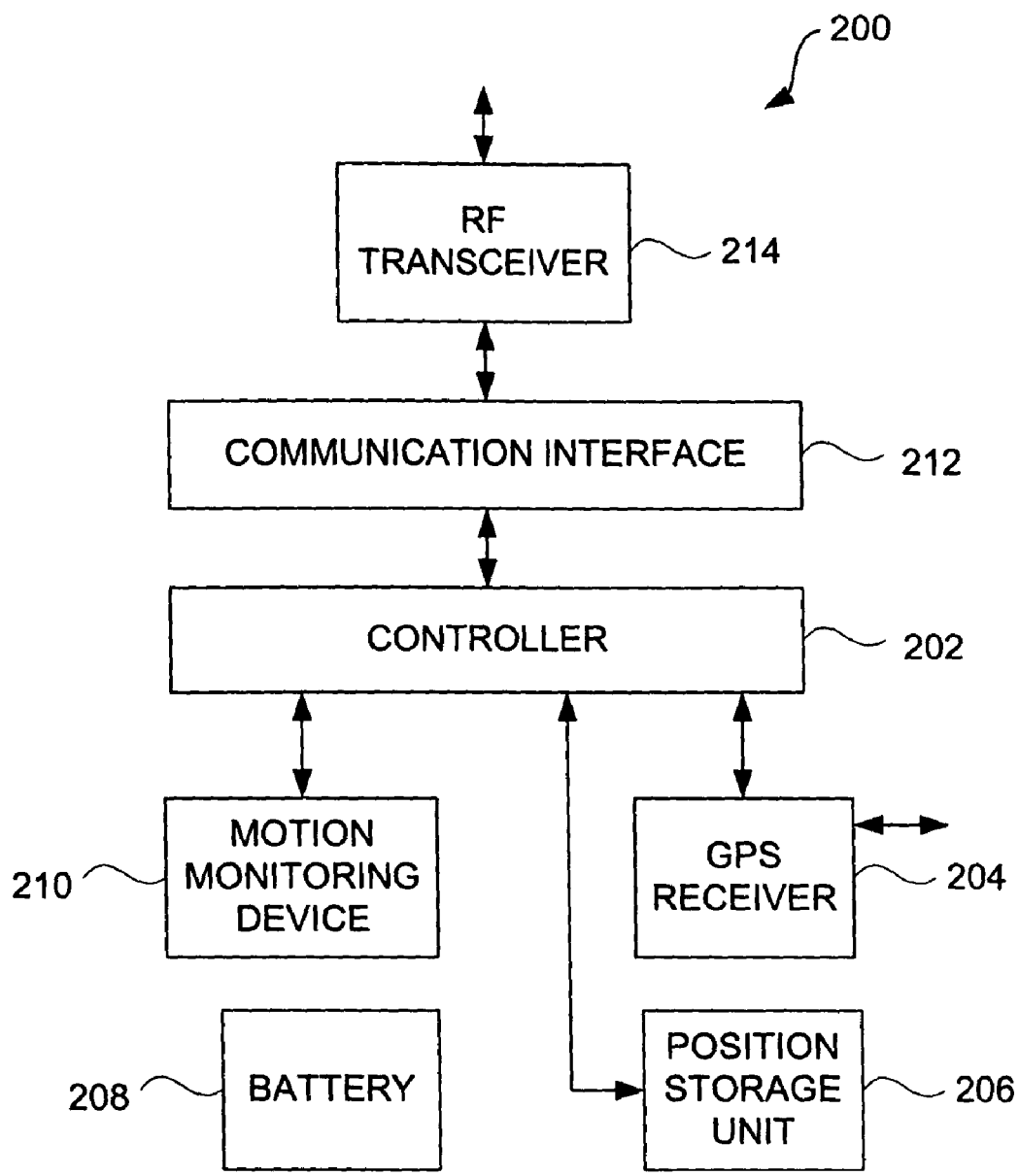
FIG. 2 illustrates a block diagram of a mobile device according to one embodiment of the invention.

FIG. 2 illustrates a block diagram of a mobile device 200 according to one embodiment of the invention. The mobile device 200 is, for example, suitable for use as the mobile device 102 illustrated in FIG. 1.

The mobile device 200 includes a controller 202 that controls the overall operation of the mobile device. The mobile device 200 provides at least location acquisition circuitry but may also include voice communication circuitry and/or data communication circuitry. Voice communication circuitry is typically found in mobile devices that operate as mobile telephones. The data communications are typically provided by mobile devices that operate to permit wireless data transfer to and from the mobile device. As shown in FIG. 2, the mobile device 200 includes circuitry for monitoring its location (or position). Although not shown in FIG. 2, additional circuitry, such as for voice or data communication or data processing, can be provided within the mobile device 200.

In one embodiment, the location acquisition circuitry of the mobile device 200 includes a GPS receiver 204. The GPS receiver 204 is utilized to receive GPS signals that are sent by a GPS satellite (such as the GPS satellite 104 illustrated in FIG. 1). The GPS receiver 204 can be controlled by the controller 202 to determine when a mobile device 200 should be receiving GPS information. When the GPS receiver 204 receives the GPS information (e.g., signals received to determine pseudo ranges) from the GPS satellite, the GPS information is typically processed by the controller 202 to produce location information. The location information is then stored by the controller 202 to a position storage unit 206. The position storage unit 206 can be a data storage device (e.g., RAM or ROM). As examples, the data storage device can be a register, semiconductor data storage, optical data storage, or magnetic data storage. It should be noted that the GPS receiver 204 can, more generally, be considered a position detection unit.

The mobile device 200 is powered by a battery 208 that is typically rechargeable. A motion monitoring unit 210 is also provided in the mobile device 200. The motion monitoring unit 210 couples to the controller 202 to provide motion information to the controller 202. The motion information is able to be determined based on one or a plurality of criteria that are monitored at the mobile device via the motion monitoring unit 210. Examples of such criteria include: acceleration, vibration, force, speed, and direction.

The motion monitoring unit 210 can be formed or constructed in a number of ways. In one embodiment, the motion monitoring unit 210 uses a micro-machined structure to sense motion. Accelerometers are known in the art and suitable for use as the motion monitoring unit 210. See, e.g., Dinsmore sensors available from Robson Company, Inc. of Erie, Pa. Various other types of sensors besides accelerometers can be additionally or alternatively used in sensing the criteria (e.g., vibration, force, speed, and direction) used in determining motion. For particularly low power designs, the one or more sensors used can be largely mechanical.

In one embodiment, by reducing the frequency at which the GPS receiver 204 is required to request, receive and resolve GPS information, the mobile device 200 is able to save power and thus extend the useful life of the battery 208. Further, the reduction in use of the GPS receiver 204 also operates to reduce the demands on wireless network bandwidth in transmitting and managing such location information.

In another embodiment, the motion monitoring unit 210 enables the GPS receiver 204 to remain in a low-power state (such as a sleep state) until an updated location for the mobile device 200 is needed. In other words, the motion monitoring unit 210 can monitor the motion of the mobile device 200 such that if only minimal motion of the mobile device 200 has been detected since the last location of the mobile device 200 was obtained utilizing the GPS receiver 204, then the controller 202 can assume (e.g., estimate) that the location of the mobile device 200 is substantially the same and thus need not wake-up (i.e., transition to normal power state) the GPS receiver 204 to acquire and process new GPS information. As a result, the GPS receiver 204 can remain in its low-power state and the controller 202 need not perform computations to resolve the GPS information to location information.

The mobile device 200 also includes a communication interface 212 and a RF transceiver 214. The communication interface 212 and the RF transceiver 214 enable the mobile device 200 to communicate with a central station, such as the base station 106 illustrated in FIG. 1. Hence, the mobile device 200 is able to wirelessly communicate with the base station 106 to provide location information to the base station 106, which then forwards the location information to the location monitoring server 108 for storage.

In general, the motion monitoring unit 210 serves to provide motion information to the controller 202. The motion information can be merely a control signal from the motion monitoring unit 210, or more complicated signals or data (e.g., position). Processing of the motion information can be performed at the controller 202, though processing could have additionally or alternatively have been performed at the motion monitoring unit 210. In any case, in one embodiment, the motion information can be used by the controller 202 to determine the degree of motion. For example, the controller 202 can measure the relative motion of the mobile device 200, such as with respect to a previous position. As another example, the motion monitoring unit 210 and/or the controller 202 can accumulate the motion of the mobile device 200 with respect to a specific previous position or status.

In one embodiment, the motion monitoring unit 210 or the controller 202 can use more than one type of criteria to identify the motion of the mobile device 200. For example, both the acceleration and speed information across a duration of time can be used to determine the distance the mobile device 200 has traveled. In yet another example, the distance the mobile device 200 has traveled can incorporate direction information. Just to illustrate, assume the mobile device 200 has traveled north at a constant speed for 10 meters and then changes 180 degrees and traveled south at the same speed for 10 meters. The mobile device 200 can sense different types of motion, e.g., speed and change of direction. The motion monitoring unit 210 and/or the controller 202 can perform calculations to determine whether the mobile device 200 has any net movement.

Figure 3:
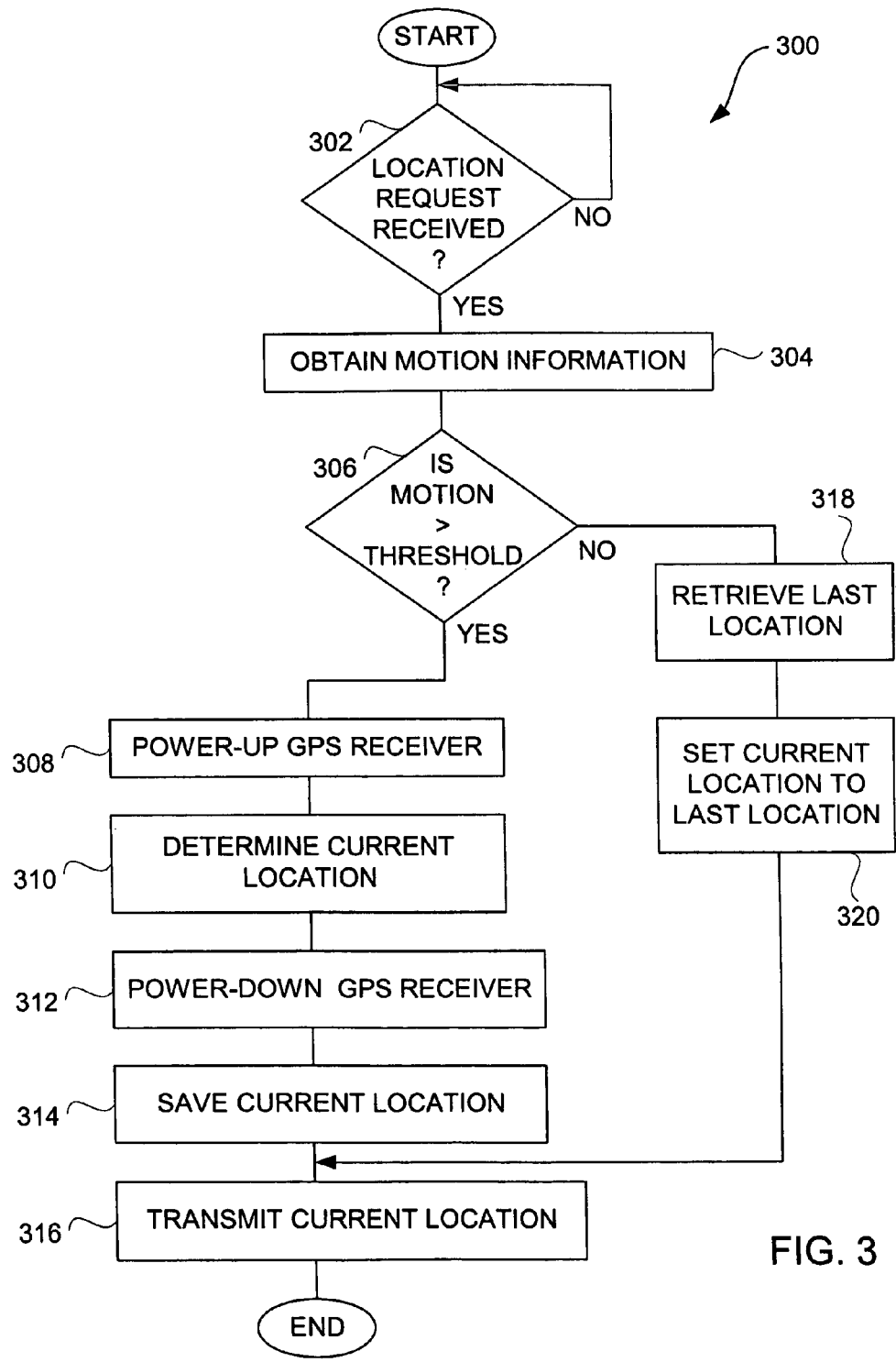
FIG. 3 is a flow diagram of location request processing according to one embodiment of the invention.

FIG. 3 is a flow diagram of location request processing 300 according to one embodiment of the invention. The location request processing 300 is, for example, performed by a mobile device, such as the mobile device 102 illustrated in FIG. 1 or the mobile device 200 illustrated in FIG. 2.

The location request processing 300 begins with a decision 302 that determines whether a location request has been received from a requestor. When the decision 302 determines that a location request has not yet been received, the location request processing 302 awaits such a request. When the decision 302 determines that a location request has been received, then motion information for the mobile device is obtained 304. For example, the motion information can be obtained from the motion monitoring unit 210 illustrated in FIG. 2. The motion information can, for example, pertain to an accumulation of motion during a time period or can pertain to a maximum motion during a time period. Motion refers to one or a combination of physical conditions on a mobile device, such as acceleration, velocity, force, vibration, etc.

Next, a decision 306 determines whether the motion is greater than a threshold amount. When the decision 306 determines that the motion is greater than a threshold amount, then the GPS receiver of the mobile device is powered-up 308. A current location for the mobile device is then determined 310 using the GPS receiver. Typically, the GPS receiver will obtain GPS information and a controller (or processor) will process the GPS information to produce a current location (or position). After the current location has been determined 310, the GPS receiver can be powered-down 312. Here, the GPS receiver is returned to a low-power state so as to conserve power. As an example, the low-power state (or powered-down state) can be a sleep mode or it can be a disabled mode. The current location is then saved 314. As an example, the current location can be saved 314 to a local storage unit, such as the position storage unit 206 illustrated in FIG. 2. The current location can be transmitted 316 to an appropriate destination. Typically, the current location would be transmitted to a location monitoring server (e.g., location monitoring server 108), and then transmitted as a data communication to the requestor, if the requestor is a remote requestor.

The current location could be transmitted separately or as a group or a batch of locations. For example, the mobile device could store the current locations and the time for such locations in the position storage unit and then transmit a group of such locations to the location monitoring server (e.g., location monitoring server 108) when needed, when convenient or when the position storage unit is nearly full. Here, the position storage unit is able to provide buffering of the locations. Alternatively or additionally, the current location could be sent to the requestor's device. Further, the current location could also be sent in a background mode if the mobile device supports other communications, for example, Short Message Service (SMS) messaging or voice communications.

On the other hand, when the decision 306 determines that the motion is not greater than the threshold, then the last location for the mobile device is retrieved 318. Typically, the last location would be retrieved from the local storage unit, such as the position storage unit 206 illustrated in FIG. 2. The current location for the mobile device is then set 320 to the last location. In other words, the current location is set to be the same as the previous location for the mobile device. Thereafter, the operation 316 can be performed to transmit the current location to the location monitoring server and/or the requestor.

Additionally, if desired, the use of a prior location or last location as the current location could be further restricted such that a location could time-out. For example, if it has been more than some time duration (e.g. 24 hours) since a last location was obtained using the GPS receiver, such location could be deemed "stale". Then the request processing 300 could activate the GPS receiver and determine a current location with operations 308-316 even though the motion for the mobile device has not exceeded the threshold.

Figure 4:
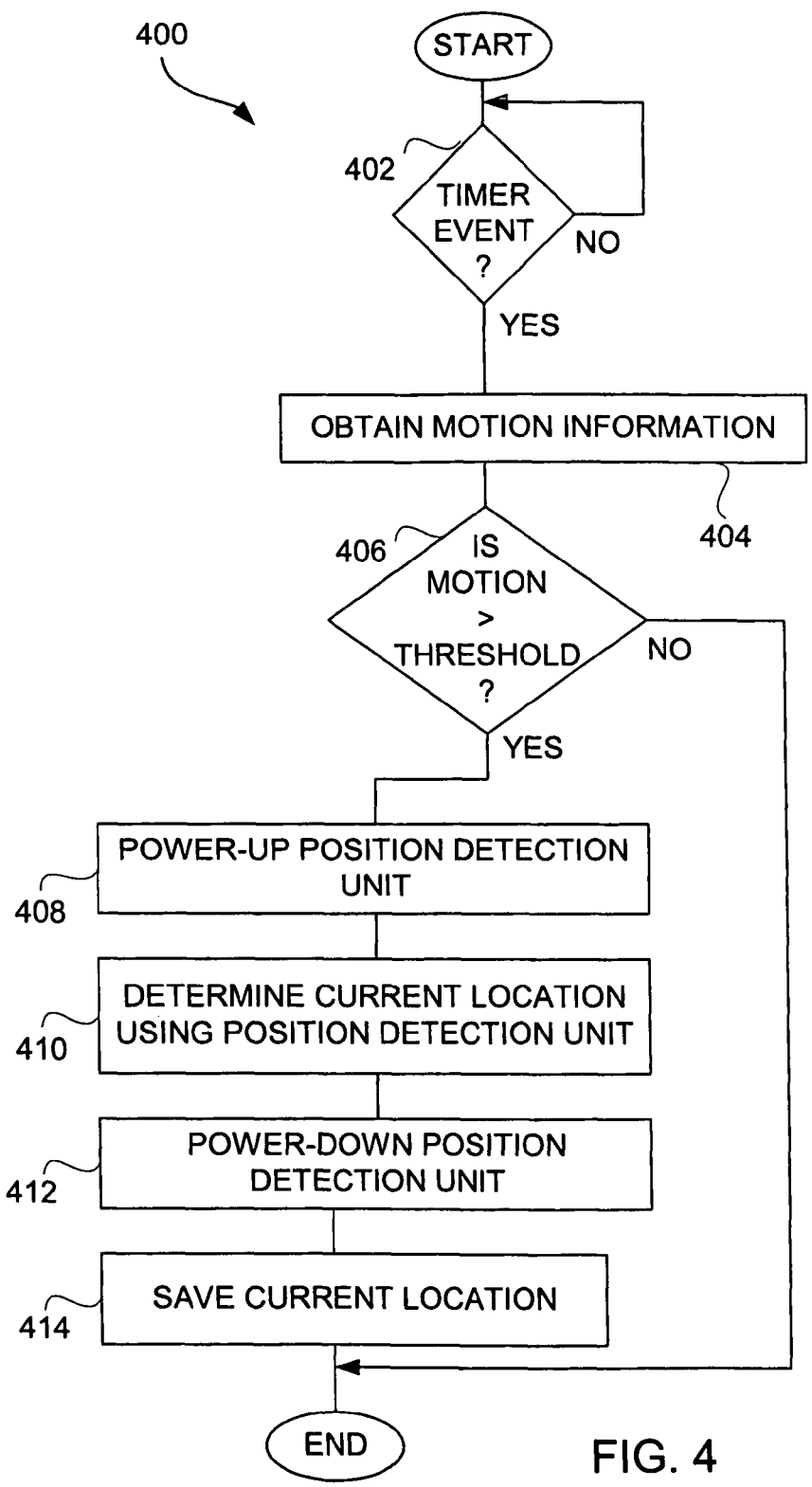
FIG. 4 is a flow diagram of location monitoring processing according to one embodiment of the invention.

FIG. 4 is a flow diagram of location monitoring processing 400 according to one embodiment of the invention. The location monitoring processing 400 begins with a decision 402 that determines whether a timer has expired. When the decision 402 determines that the timer has not yet expired, then the location monitoring processing 400 awaits such an event. In other words, the location monitor processing 400 is invoked on a periodic basis to check the location for a mobile device. Alternatively, the location monitor processing 400 could be invoked on an event basis other than time, such as a motion event, though this embodiment is discussed with reference to a timer event.

When the decision 402 determines that a timer event has occurred, then motion information is obtained 404. The motion information can be accumulated during an interval or merely a maximum motion indication during an interval, or some other motion criteria. A decision 406 then determines whether the motion is greater than a threshold. When the decision 406 determines that the motion is greater than the threshold, the GPS receiver is powered-up 408. Then, the current location is determined 410 using the GPS receiver. After the current location has been determined 410, the GPS receiver is powered-down 412. The current location is saved 414. Alternatively, when the decision 406 determines that the motion is not greater than the threshold, then the operations 408-414 are bypassed such that the motion information is utilized to avoid having to again determine a location when the amount of movement has been insufficient to cause a substantial change in location. In which case, power consumption by the GPS receiver and the processing of location information is able to be substantially reduced such that battery life is prolonged. After the operation 414, or its being bypassed, the location monitor processing 400 is complete and ends.

It should be noted that the determination of the current location at operation 410 could utilize simply GPS information received from the GPS receiver, or need not fully resolve the location of the mobile device (e.g., pseudo ranges) or some partially processed variant therefrom.

The location monitor processing 400 is suitable for around-the-clock type monitoring of the location of a mobile device. The motion criteria and the low power maintenance of the GPS receiver allow the mobile device to significantly reduce its power consumption while still providing constant location monitoring. The location monitor processing 400 is also suitable for use in having the mobile device "push" its location when it has changed (even though not being requested by a requestor). For example, the mobile device could "push" its location when a threshold condition is exceeded.

Additional power management approaches can be utilized in conjunction or in combination with those for the use of the GPS receiver. Still further, in addition to utilizing a low-power state for the GPS receiver and the use of motion information, other techniques can be utilized. For example, with respect to FIG. 4, if periodically polled, the polling frequency can be decreased if the battery charge is deemed low. For example, if the battery for the mobile device has gotten rather low, it needs recharged. However, since the battery is already low, the polling frequency could be decreased such that the lifetime of the battery can be extended in the event that the battery is not recharged promptly. In one embodiment, the duration of a timer can be extended to decrease the pooling frequency. Likewise, the threshold level could be varied depending on battery level. Further, the amount of processing performed with respect to the GPS information received from the GPS receiver and/or its resolution can be minimally processed at the mobile device to save power. Also, in the event that the location information needs to be further processed, such processing could be performed at a centralized or remote site such as the location monitoring server. Also, as noted above, the sending of the location data can be done more efficiently, such as in groups or batches, or in a background mode. Still further, the polling frequency could be increased to gather more location information if the motion information indicates that the mobile device is undergoing a high degree of motion.

Figure 5:
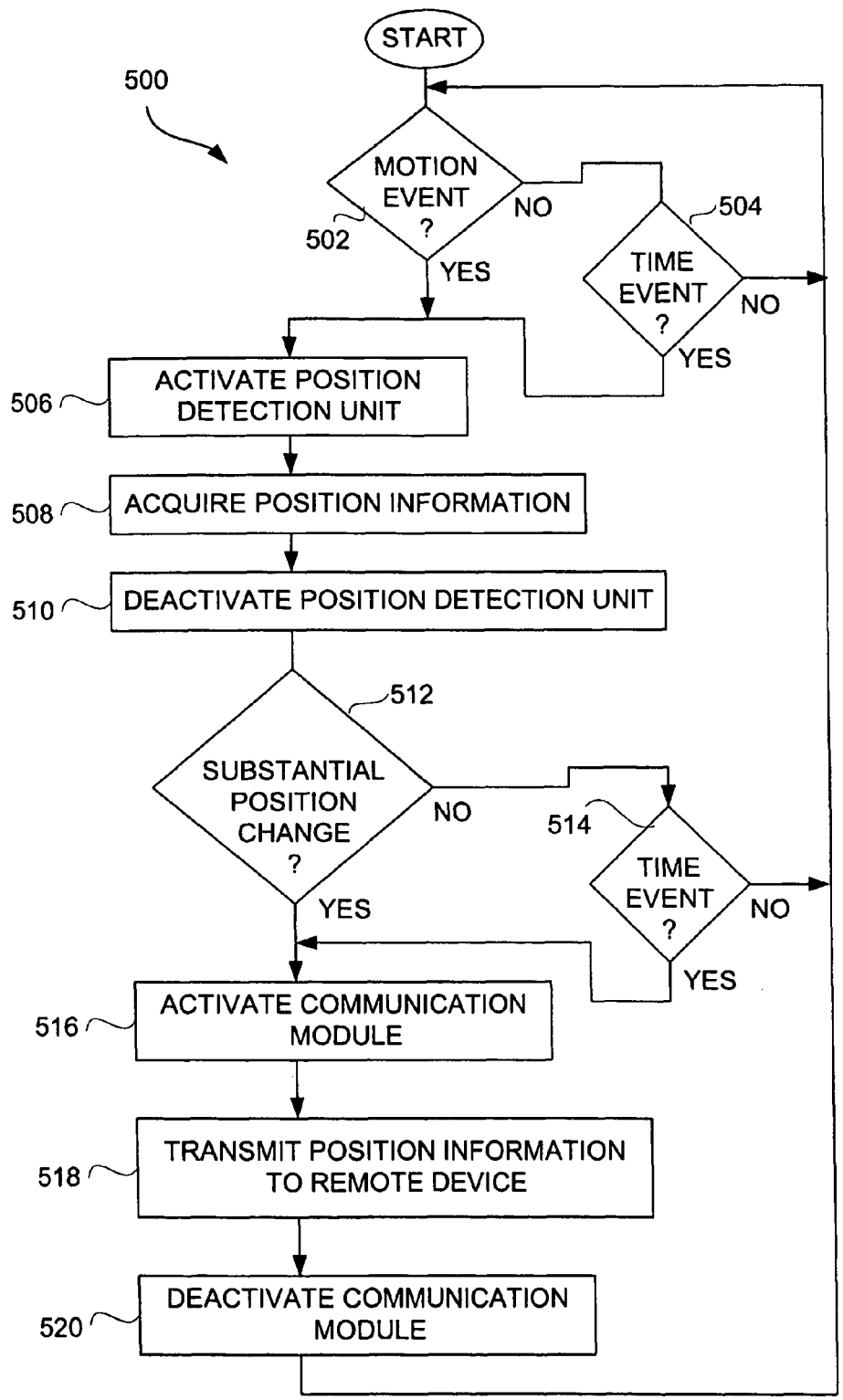
FIG. 5 is a flow diagram of power managed position monitoring according to one embodiment of the invention.

FIG. 5 is a flow diagram of power managed position monitoring 500 according to one embodiment of the invention. The power managed position monitoring 500 can, for example, be performed by the mobile device 200 shown in FIG. 2, which can be used as a position monitoring apparatus.

The power managed position monitoring 500 begins with a decision 502 that determines whether a motion event has occurred. When the decision 502 determines that a motion event has not occurred, a decision 504 determines whether a time event has occurred. When the decision 504 determines that a time event has not occurred, then the power managed position monitoring 500 returns to repeat the decision 502 and subsequent operations. In other words, the power managed position monitoring 500 is effectively invoked when a motion event has occurred or a time event has occurred. In one implementation, the time event can be set to a lengthy delay such as 24 hours so that a time event occurs every 24 hours which guarantees that one position will be obtained on a 24 hour basis regardless of motion. In one implementation, the motion event is triggered based on a threshold level. The threshold level can be dynamically changed or selected based on various conditions.

When the decision 502 determines that a motion event has occurred or when the decision 504 determines that a time event has occurred, the positioning detection unit of the position monitoring apparatus is activated 506. Then, using a position detection unit, position information is acquired 508. Thereafter, the position detection unit is deactivated 510. Here, in order to conserve power, the position detection unit remains inactive, which can pertain to powered-off, disabled, sleep, hibernate, or other low power mode. It is only when position information is to be acquired that the position detection unit is activated.

Next, a decision 512 determines whether a substantial position change has occurred. Here, the position information that has been acquired 508 is compared to a prior position information that was previously acquired. When the difference in position indicates that there has been no substantial position change, then a decision 514 determines whether a time event has occurred. Here, the time event can provide a fail safe such that a position is obtained once during the period provided by the time event regardless of change in position. Here, the time event can be the same time event or a different time event than that used with the decision 504. When the decision 514 determines that a time event has not occurred, then the power managed position monitoring 500 returns to repeat the decision 502 and subsequent operations.

On the other hand, when the decision 512 determines that a substantial position change has occurred or when the decision 514 determines that a time event has occurred, then additional processing is carried out to transmit the position information to a remote device. More particularly, a communication module of the position monitoring apparatus is activated 516. Then, the position information is transmitted 518 to a remote device. Typically, the remote device provides centralized storage and processing for position information pertaining to a plurality of position monitoring apparatuses. After the position information has been transmitted 518, the communication module is deactivated 520. Here, in order to conserve power, the communication module remains inactive, which can pertain to powered-off, disabled, sleep, hibernate, or other low power mode. It is only when position information is to be transmitted (or received) from a remote device that the communication module is activated. Following the operation 520, the power managed position monitoring 500 returns to repeat the decision 502 and subsequent operations so that subsequent motion events and time events can be similarly processed.

The power managed position monitoring 500 indicates that the position detection unit and the communication module of the position monitoring apparatus can be maintained in a low-power state until such circuitry is needed. This results in a substantial savings in power consumption by the position monitoring apparatus. Further, the position monitoring apparatus is thus suitable for long term, constant (e.g., 24/7) position monitoring. Additionally, should the position monitoring apparatus include a controller, the controller can also be set to a low-power state when position information is not being acquired or transmitted. In such a low-power state, the controller might still be able to monitor for motion events and time events and might also be capable of monitoring, or even waking itself up, when a request from a remote device is received.

Figure 6:
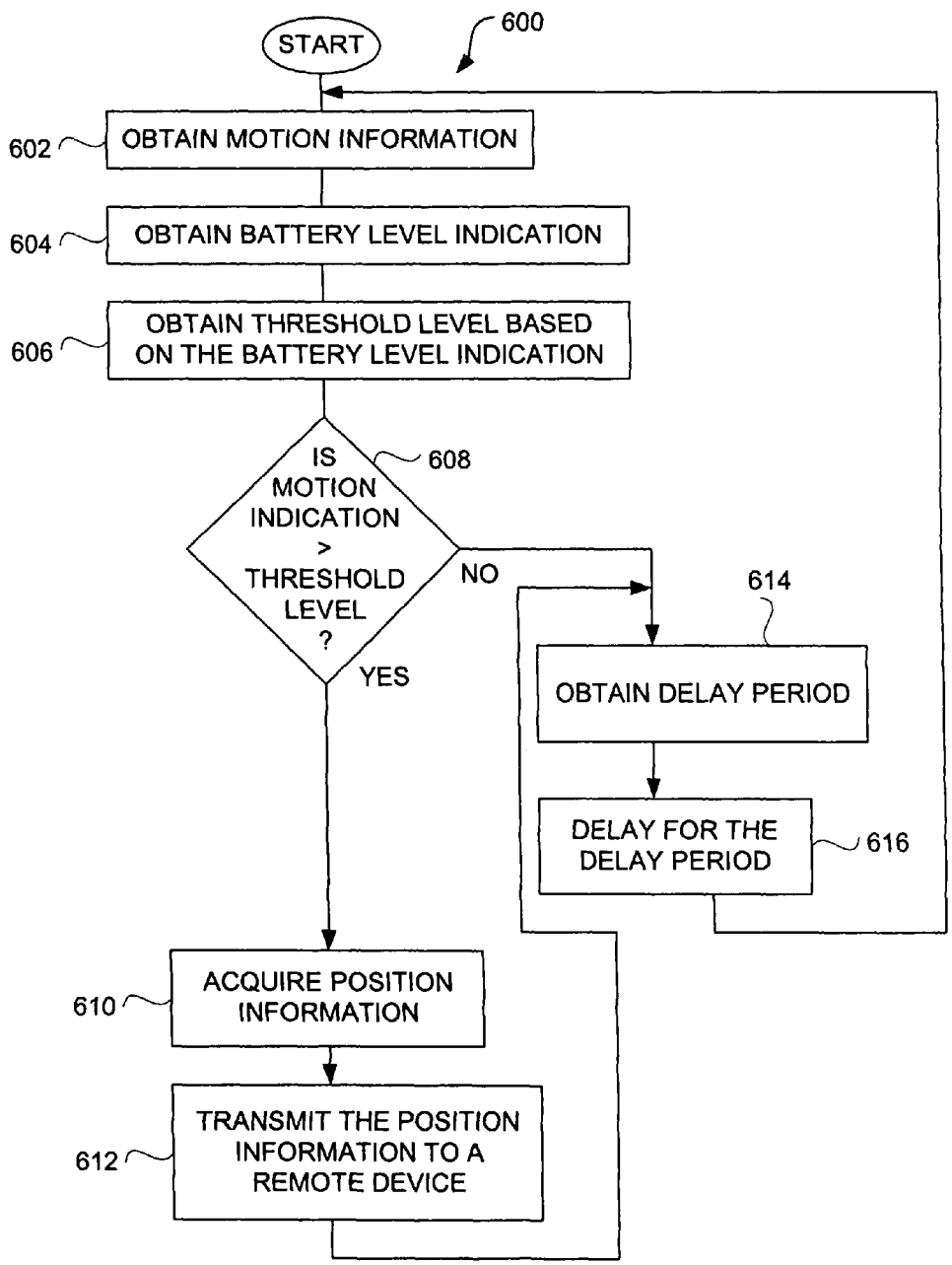
FIG. 6 is a flow diagram of power managed position monitoring according to another embodiment of the invention.

FIG. 6 is a flow diagram of power managed position monitoring 600 according to another embodiment of the invention. The power managed position monitoring 600 is, for example, performed by the position monitoring apparatus 200 shown in FIG. 2.

The power managed position monitoring 600 obtains 602 a motion indication. The motion indication pertains to motion that the position monitoring apparatus has undergone. For example, the motion indication might indicate a maximum motion that has occurred during a time period or since last evaluated, or an accumulation of motion that has occurred during the time period or since last evaluated. The motion indication might pertain to an acceleration, velocity, vibration and the like. In addition, a battery level indication is obtained 604. The battery level indication might, for example, pertain to or depend on a charge level of the battery or a voltage level of the battery. Next, a threshold level is obtained 606 based on at least the battery level indication. Here, the threshold level to be utilized is variable depending upon at least the battery level indication.

A decision 608 determines whether the motion indication is greater than the threshold level. When the decision 608 determines that the motion indication is greater than the threshold level, the position information is acquired 610. The position information pertains to the position monitoring apparatus. Then, the position information is transmitted 612 to a remote device. Typically, the remote device provides centralized storage and processing for position information pertaining to a plurality of position monitoring apparatuses.

Following the operation 612, as well as following the decision 608 when the motion indication does not exceed the threshold level, a delayed period is obtained 614. The delay period can be static or dynamic. In other words, the delay period can be fixed or the delay period can vary depending upon other considerations. In one implementation, the delay period can be varied depending upon the battery level indication. For example, if the battery level indication indicates that the battery charge is low, the delay period can be increased so as to prolong the ability of the position monitoring apparatus to monitor its position. Once the delay period is obtained 614, the power managed position monitoring 600 delays 616 for the delay period. During the delay period the various components, modules, units or circuitry of the position monitoring apparatus can be placed in a low power state so as to preserve power during the delay period. After the delay period, the power managed position monitoring 600 returns to repeat the operation 602 and subsequent operations so that additional position information can be acquired and transmitted as appropriate.

In this embodiment, the threshold level is based on at least the battery level indication. As the battery level indication indicates that the charge of the battery is low, the threshold level for the motion indication comparison can be increased so that position information is acquired and transmitted less frequently, thereby conserving power of the battery that has limited available charge.

Although the power managed position monitoring 600 is capable of altering the threshold level based on the battery level indication as well as capable of altering the delay period based on the battery level indication or other considerations, it should be understood that, more generally, that position monitoring can be power managed using one or both of threshold level adjustment and delay period adjustment. For example, the power managed position monitoring 600 could use a static threshold level (e.g., static with respect to battery level) and alter the delay period based on the battery level indication.

Figure 7:
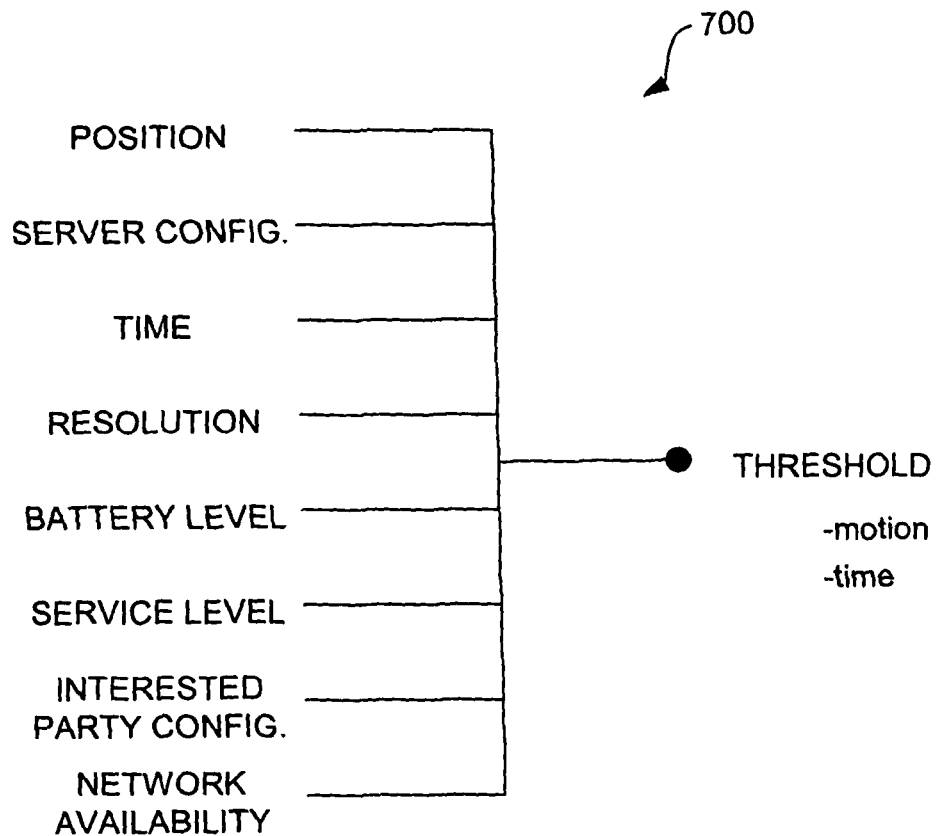
FIG. 7 illustrates an exemplary diagram of dynamic threshold dependency.

FIG. 7 illustrates an exemplary diagram of dynamic threshold dependency 700. The dynamic threshold dependency pertains to a threshold utilized by the position monitoring apparatus. For example, the threshold can be a degree of motion or an amount of time. For example, the degree of motion can pertain to a motion threshold utilized in the decision 608 of the power managed position monitoring 600 shown in FIG. 6, and the amount of time can pertain to a time threshold utilized by the operation 614 of the power managed position monitoring 600 shown in FIG. 6. As another example, the degree of motion can be used with the motion event at the decision 502 of the power managed position monitoring 500 shown in FIG. 5, and the time events at the decisions 504 and 514 of the power managed position monitoring 500 shown in FIG. 5.

In any case, the thresholds can vary or depend upon one or more various considerations. These considerations include, as illustrated in FIG. 7, one or a combination of position, server configuration, time, resolution, battery level, service level, interested party configuration, and network availability.

The threshold can vary depending upon the position of the position monitoring apparatus. Consequently, position information could be acquired more often in some positions and less often in other positions. For example, a certain part of town where the layout is quite complicated, with many closely-spaced one-way streets, might require more frequent acquisition of position information. However, a rural area may lead to less frequent acquisition of position information.

The server configuration can pertain to that configuration of a remote device (e.g., remote server) that provides centralized storage and management of position information of many position monitoring apparatuses. Here, the server configuration can control the one or more thresholds utilized so that the position information is obtained in accordance with the server configuration. Although the applications can vary, one example is that a server may want to set limits on position acquisition or transmission of remote devices.

The thresholds can also vary with time. For example, during peak use periods of the remote device, the thresholds can be higher so that less position information is acquired. This can be because during peak use periods, the bandwidth becomes limited. Also, power consumption is typically higher during peak use. This can be done by increasing the thresholds during peak time to discourage usage. In contrast, during non-peak use periods, the thresholds can be set lower. From a different perspective, the peak use can refer to the peak use of the position monitoring apparatus. Then, during certain period of time, if a user desires more frequent position information, then the thresholds can be lower during those periods so that more position information is acquired.

A resolution for the position information can be set by a remote user through the remote server and/or can be set directly on the position monitoring apparatus. For example, the position monitoring apparatus can permit a user to set a resolution, such as low, medium or high resolution. Depending upon the type of resolution being selected, the thresholds can vary so that the desired resolution can be achieved.

The battery level can affect the thresholds as noted above.

Thresholds can be changed according to the type of subscriptions or service charges. For example, the system providing the capabilities of the location monitoring services may provide different service levels for the users of the system. In which case, the different service levels can signal different threshold levels. This allows those users that have agreed to utilize more expensive service levels to obtain improved, high end or better resolution position information.

Interested parties can interact with the remote device or server through a web interface. As such, interested parties can themselves request configuration or monitoring capabilities through the web interface. The interested party can change configurations to affect the threshold levels.

Still further, network availability can affect the threshold levels. For example, when network availability is low, the threshold levels can be increased. On the other hand, when network availability is high, the threshold levels could be decreased.

In one embodiment, the mobile device (mobile communication device) can include a solar panel. The solar panel can provide electrical power for the mobile device. The solar panel can thus charge a battery used to power the mobile device and/or itself power the mobile device. When the mobile device is affixed to a person to be monitored, the solar panel can remain at least partially exposed to the outside environment so as to be able to receive light. The solar panel can be integrated with the housing of the mobile device or can be separate and coupled to the mobile device via one or more wires (e.g., a cable).

The present invention has described one or more GPS devices as to identify a location. However, the present invention is not limited to using GPS devices. In certain situations, other wireless or mobile devices can also serve as location-designating devices or position detection units, such as devices based on GSM technologies, Bluetooth or Wi-Fi technologies. Through the techniques of triangulation, these devices can also designate a location. Such triangulation techniques should be known to those skilled in the art.

As noted above, the location monitoring provided through used of the mobile devices can be used to monitor location of objects. The objects whose location is being monitored can vary with application. Examples of objects that can be monitored include people, animals (e.g., pets), articles (e.g., packages, vehicles, vessels), or other assets.

A number of embodiments have been described based on a mobile device. Generally speaking, the mobile device can be a cell phone, a personal digital assistant, a pager, camera, a personal computer or other devices with communication capabilities. The form factor of the mobile device can be small, such as wearable, pager sized or smaller, or pocket sized. Additional information on mobile devices is provided in U.S. patent application Ser. No. 10/397,640, filed concurrently herewith, and entitled "INEXPENSIVE POSITION SENSOR," which is hereby incorporated herein by reference.

The above-described systems, devices, methods and processes can be used together with other aspects of a monitoring system, including the various aspects described in: (i) U.S. Provisional Patent Application No. 60/444,198, filed Jan. 30, 2003, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (ii) U.S. Provisional Patent Application No. 60/418,491, filed Oct. 15, 2002, and entitled "SYSTEM, METHOD AND APPARATUS FOR ACQUIRING, PRESENTING, MONITORING, DELIVERING, MANAGING AND USING STATUS INFORMATION," which is hereby incorporated herein by reference; (iii) U.S. Provisional Patent Application No. 60/404,645, filed Aug. 19, 2002, and entitled "SYSTEM, METHOD AND APPARATUS FOR ACQUIRING, PRESENTING, MONITORING, DELIVERING, MANAGING AND USING POSITION AND OTHER INFORMATION," which is hereby incorporated herein by reference; and (iv) U.S. Provisional Patent Application No. 60/375,998, filed Apr. 24, 2002, and entitled "SYSTEM, METHOD AND APPARATUS FOR ACQUIRING, PRESENTING, MANAGING AND USING POSITION INFORMATION," which is hereby incorporated herein by reference.

The various embodiments, implementations, features and aspects of the invention noted above (including those incorporated by reference) can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. The invention, or at least certain software portions of the invention, can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield different advantages. One advantage of the invention is that position information can be acquired in a power efficient manner. Another advantage of the invention is that position monitoring can be achieved over an extended period. Still another advantage of the invention is that position information of objects being monitored can be centrally maintained and available through access to a website (e.g., monitoring server). Yet another advantage of the invention is that position monitoring apparatus can be inexpensive and have a small form factor, and thus be suitable for many uses.

The many features and advantages of the present invention are apparent from the written description, and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A portable position acquisition apparatus, comprising:
a position detection unit that detects position information pertaining to said position acquisition apparatus;
a memory that stores the position information;
a battery for providing power to said position acquisition apparatus;
a motion monitoring unit that obtains motion information by monitoring motion of said position acquisition apparatus;
a communication interface that enables said position acquisition apparatus to transmit data to a remote device via a wireless channel, the data being transmitted includes at least the position information; and
a controller operatively connected to said position detection unit, said motion monitoring unit, said memory and said communication interface, said controller causing said position detection unit to reacquire the position information based on the motion information obtained by said motion monitoring unit and a battery level characteristic of said battery,
wherein said controller determines a periodic basis at which said position detection unit is to reacquire the position information pertaining to said position acquisition apparatus, the periodic basis at which said position detection unit reacquires the position information varies depending on at least the battery level characteristic of said battery,
wherein said position detection unit reacquires the position information in a manner dependent on whether said position acquisition apparatus is in motion,
wherein said position detection unit does not reacquire the position information on the periodic basis when said position acquisition apparatus is deemed not in motion,
wherein said position detection unit reacquires the position information in accordance with the periodic basis when said position acquisition apparatus is deemed in motion,
wherein when said position acquisition apparatus is deemed to be in motion, then said communication interface transmits the data to the remote device periodically, and when said position acquisition apparatus is deemed not to be in motion, then said communication interface does not transmit the data to the remote device periodically, and
wherein when said position acquisition apparatus is deemed to be in motion, then said position detection unit continues to reacquire the position information periodically but less frequently when the battery level characteristic indicates a reduced power level of said battery.

2. A portable position acquisition apparatus as recited in claim 1, wherein said communication interface transmits the data to the remote device via the wireless channel as a group of positions acquired by said position detection unit.

3. A portable position acquisition apparatus as recited in claim 1, wherein the data being transmitted includes at least the position information.

4. A portable position acquisition apparatus as recited in claim 1, wherein said position acquisition apparatus is one or more of wearable, pager sized or smaller, and pocket sized.

5. A portable position acquisition apparatus as recited in claim 1, wherein said position detection unit comprises a GPS receiver.

6. A portable position acquisition apparatus as recited in claim 1, wherein the data being transmitted is transmitted in a SMS message.

7. A portable position acquisition apparatus as recited in claim 1, wherein said controller determines whether to reacquire the position information based on a threshold level, and wherein the threshold level dynamically adjusts to a higher level when the battery level characteristic indicates a reduced power level of said battery.

8. A portable position acquisition apparatus as recited in claim 1,
wherein a frequency at which said communication interface transmits the data to the remote device is dependent on the battery level characteristic of said battery such that the frequency adapts to a lower frequency as the battery level characteristic declines.

9. A portable position acquisition apparatus as recited in claim 1, wherein said motion monitoring unit monitors motion of said position acquisition apparatus based on at least one criteria select from the group consisting of acceleration, vibration, force, speed, and direction.

10. A portable position acquisition apparatus, comprising:
a position detection unit that detects position information pertaining to said position acquisition apparatus;
a memory that stores the position information;
a motion monitoring unit that obtains motion information by monitoring motion of said position acquisition apparatus;
a battery for providing power to said position acquisition apparatus; and
a controller operatively connected to said position detection unit, said memory, said battery and said motion monitoring unit, said controller operates to at least:
  receive the motion information from said motion monitoring unit;
  deactivate said position detection unit from reacquiring position information if the motion information indicates that said position acquisition apparatus is not in motion;
  determine if said position detection unit has not reacquired position information for a predetermined period of time; and
  activate said position detection unit to reacquire position information independent of the motion information if it is determined that said position detection unit has not reacquired position information for a predetermined period of time,
wherein the motion information indicates motion of said position acquisition apparatus based on a threshold level, and wherein the threshold level varies depending on a battery level characteristic of said battery.

11. A portable position acquisition apparatus as recited in claim 10, wherein when a degree of motion of said position acquisition apparatus is less than a threshold amount then said position detection unit ceases to reacquire the position information or reduces a frequency at which the position information is reacquired.

12. A portable position acquisition apparatus as recited in claim 10, wherein said position acquisition apparatus further comprises:
a communication interface that enables said position acquisition apparatus to wirelessly transmit data to a remote device,
wherein said controller is operatively connected to said communication interface.

13. A portable position acquisition apparatus as recited in claim 12, wherein a frequency at which said communication interface transmits the data to the remote device is dependent on a degree of motion of said position acquisition apparatus, whereby when the degree of motion of said position acquisition apparatus is less than a threshold amount then said communication interface ceases to transmit the data or reduces the frequency at which the data is transmitted.

14. A portable position acquisition apparatus as recited in claim 10, wherein if the motion information indicates motion of said position acquisition apparatus, said position detection unit operates to periodically reacquire position information.

15. A portable position acquisition apparatus as recited in claim 10, wherein the predetermined period of time provides a minimum rate of reacquisition of position information.

16. A portable position acquisition apparatus as recited in claim 10, wherein said position acquisition apparatus is a position tracking device designed primarily for tracking position.

17. A portable position acquisition apparatus as recited in claim 10, wherein said position acquisition apparatus is wearable.

18. A portable position acquisition apparatus, comprising:
a position detection unit that detects position information pertaining to said position acquisition apparatus;
a memory that stores the position information;
a battery for providing power to said position acquisition apparatus;
a motion monitoring unit that obtains motion information by monitoring motion of said position acquisition apparatus;
a communication interface that enables said position acquisition apparatus to transmit data to a remote device via a wireless channel, the data being transmitted includes at least the position information; and
a controller operatively connected to said position detection unit, said motion monitoring unit, said memory and said communication interface, said controller causing said position detection unit to reacquire the position information based on the motion information obtained by said motion monitoring unit and a battery level characteristic of said battery,
wherein said controller determines a periodic basis at which said position detection unit is to reacquire the position information pertaining to said position acquisition apparatus, the periodic basis at which said position detection unit reacquires the position information varies depending on at least the battery level characteristic of said battery,
wherein said position detection unit reacquires the position information in a manner dependent on whether said position acquisition apparatus is in motion,
wherein said position detection unit does not reacquire the position information on the periodic basis when said position acquisition apparatus is deemed not in motion,
wherein said position detection unit reacquires the position information in accordance with the periodic basis when said position acquisition apparatus is deemed in motion, and
wherein when said position acquisition apparatus is deemed to be in motion, then said communication interface transmits the data to the remote device based on a period, and when said position acquisition apparatus is deemed not to be in motion, then said communication interface does not transmit the data to the remote device based on the period.

19. A portable position acquisition apparatus as recited in claim 18, wherein when said position acquisition apparatus is deemed to be in motion, then said position detection unit continues to reacquire the position information periodically but less frequently when the battery level characteristic indicates a reduced power level of said battery.

20. A portable position acquisition apparatus as recited in claim 18, wherein said position acquisition apparatus is a position tracking device designed primarily for tracking position.

21. A portable position acquisition apparatus as recited in claim 18, wherein said position acquisition apparatus is wearable.

22. A portable position acquisition apparatus as recited in claim 18, wherein said position detection unit has at least a low-power state and a normal power state, and wherein said position detection unit remains in the low-power state while position information is not being acquired, whereby power of said battery is conserved when said position detection unit is in the low-power state.

23. A portable position acquisition apparatus as recited in claim 18, wherein the data being transmitted is transmitted in a SMS message.

24. A portable position acquisition apparatus as recited in claim 18,
 wherein the data being transmitted includes at least the position information, and
 wherein said communication interface avoids transmission of the position information to the remote device when the position information differs from prior position information by less than a transmission threshold amount.

25. A portable position acquisition apparatus as recited in claim 24, wherein the transmission threshold amount is configurable or dynamic based on a condition of said position acquisition apparatus.

26. A portable position acquisition apparatus as recited in claim 18,
 wherein the data being transmitted includes at least the position information,
 wherein said communication interface has at least a normal power state and a low-power state,
 wherein, when the position information differs from prior position information by at least a transmission threshold amount, said communication interface transitions to the normal power state and then transmits the position information to the remote device,
 wherein after said communication interface transmits the position information to the remote device, said communication interface transitions to the low-power state, and
 wherein said position detection unit is disabled or placed in a sleep mode when in the low-power state.

27. A portable position acquisition apparatus as recited in claim 26, wherein the transmission threshold amount is configurable or dynamic based on one or a combination of position, server configuration, time, resolution, service level, interested party configuration, and network availability.

28. A portable position acquisition apparatus as recited in claim 18, wherein said position detection unit comprises a GPS receiver.

29. A portable position acquisition apparatus as recited in claim 18, wherein said position acquisition apparatus is pager sized or smaller.

30. A portable position acquisition apparatus as recited in claim 18, wherein the battery level characteristic pertains to one or more of charge, current, voltage or power of said battery.

31. A portable position acquisition apparatus as recited in claim 18, wherein when a degree of motion of said position acquisition apparatus is less than a threshold amount then said position detection unit ceases to reacquire the position information or reduces a period at which the position information is reacquired.

32. A portable position acquisition apparatus as recited in claim 28, wherein a frequency at which said communication interface transmits the data to the remote device is dependent on a degree of motion of said position acquisition apparatus, whereby when the degree of motion of said position acquisition apparatus is less than a threshold amount then said communication interface ceases to transmit the data or reduces the frequency at which the data is transmitted.

33. A portable position acquisition apparatus as recited in claim 18,
 wherein the data being transmitted includes at least the position information, and
 wherein a frequency at which said communication interface transmits at least the position information to the remote device is dependent on a degree of motion of said position acquisition apparatus, whereby when the degree of motion of said position acquisition apparatus is less than a threshold amount then said communication interface ceases to transmit the position information or reduces the frequency at which the position information is transmitted.

\* \* \* \* \*